(12) United States Patent
Smith

(10) Patent No.: US 11,650,726 B1
(45) Date of Patent: May 16, 2023

(54) GRAPHICAL USER INTERFACE TRANSFORMATION OF INLINE CARD TO PERSISTENT SNACKBAR

(71) Applicant: Intuit Inc., Mountain View, CA (US)

(72) Inventor: Samuel Austin Smith, Trophy Club, TX (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/962,337

(22) Filed: Oct. 7, 2022

(51) Int. Cl.
*G06F 3/0482* (2013.01)
*G06F 3/04845* (2022.01)

(52) U.S. Cl.
CPC ........ *G06F 3/04845* (2013.01); *G06F 3/0482* (2013.01)

(58) Field of Classification Search
CPC .......................... G06F 3/04845; G06F 3/0482
See application file for complete search history.

(56) References Cited

U.S. PATENT DOCUMENTS

| | | | | |
|---|---|---|---|---|
| 10,437,441 B2* | 10/2019 | Youn | ...................... | G06F 1/163 |
| 10,915,234 B2* | 2/2021 | Macho Cierna | .... | G06F 3/04817 |
| 10,942,978 B1* | 3/2021 | Paul | ........................ | G06Q 50/01 |
| 11,157,148 B2* | 10/2021 | Brown | ............... | H04M 1/72436 |
| 2015/0067582 A1* | 3/2015 | Donnelly | ............... | G06F 3/0481 715/800 |
| 2016/0026352 A1* | 1/2016 | Brown | .................... | H04L 51/52 715/752 |
| 2017/0115860 A1* | 4/2017 | Youn | ....................... | G04G 21/08 |
| 2020/0067901 A1* | 2/2020 | Marchand | ............ | H04W 12/068 |
| 2022/0139569 A1* | 5/2022 | Gilbert | .................... | G16H 40/63 705/2 |
| 2022/0404953 A1* | 12/2022 | Dolbakian | ............. | G06F 3/0482 |

* cited by examiner

*Primary Examiner* — Anil K Bhargava
(74) *Attorney, Agent, or Firm* — Paradice & Li LLP

(57) ABSTRACT

Systems and methods for manipulating a graphical user interface (GUI) are described. The GUI is configured to show, to a user, a transition from displaying an inline card to displaying a corresponding snackbar. The system uses an overlay to seamlessly show the transition without requiring significant edits to most portions of the GUI. In various implementations, a system displays an inline card in a base layer of a GUI and receives an input associated with the inline card. In response to receiving the input, the system generates a transitional object in an overlay of the GUI (with the overlay displayed over the base layer), generates a snackbar in the base layer, adjusts the transitional object in the overlay from covering the inline card to covering where the snackbar is generated, and removes the transitional object from the GUI.

14 Claims, 34 Drawing Sheets

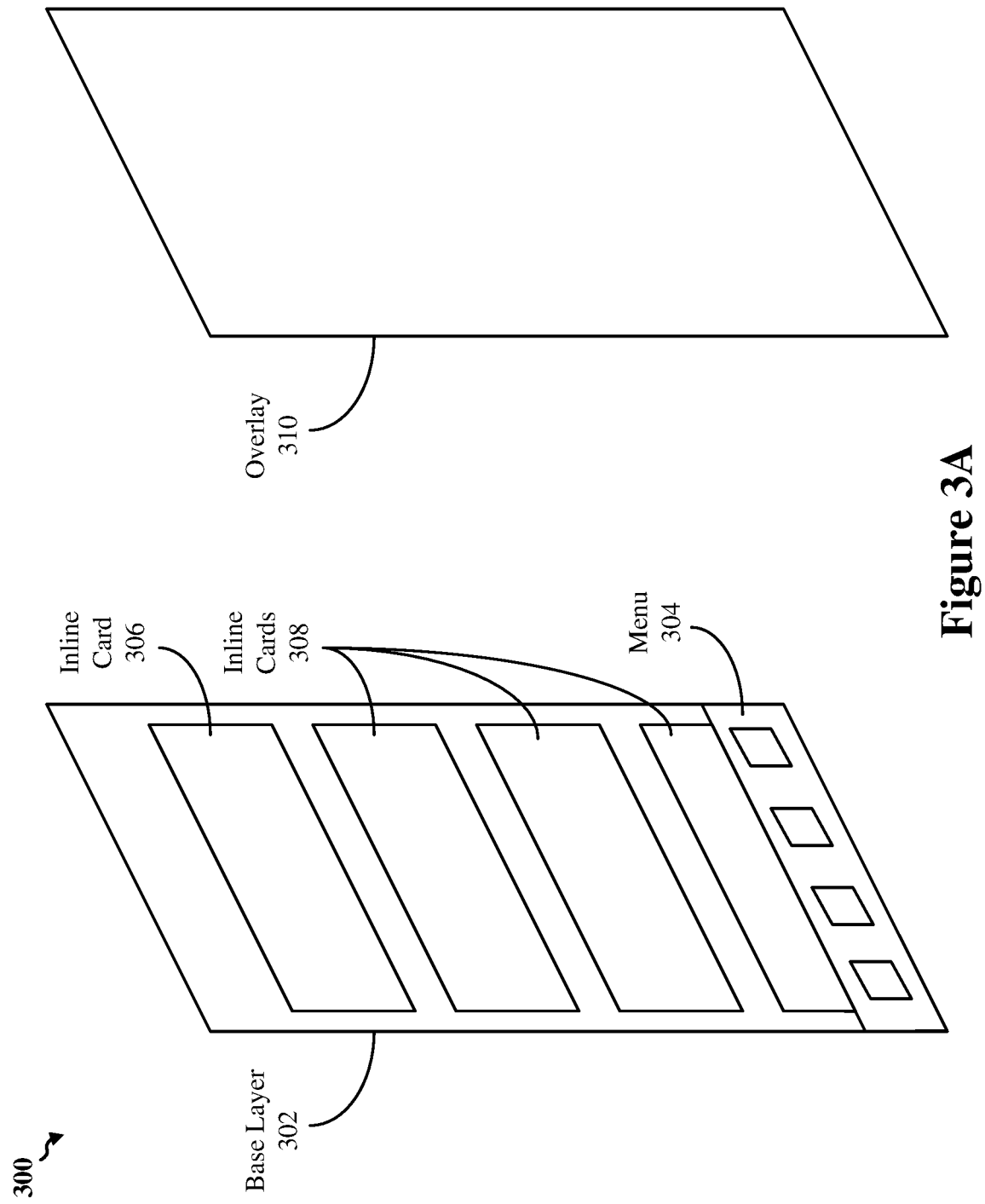

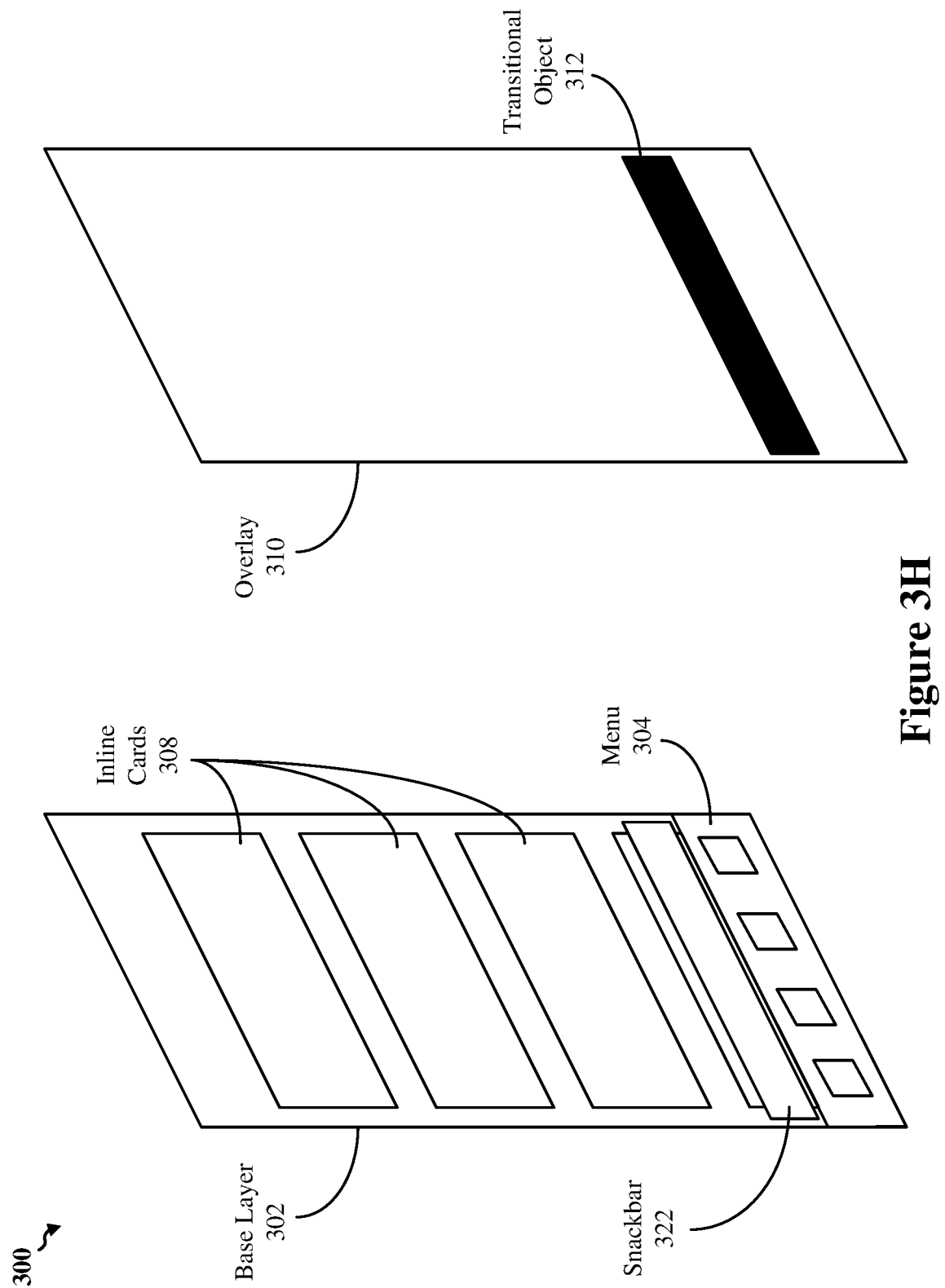

GRAPHICAL USER INTERFACE TRANSFORMATION OF INLINE CARD TO PERSISTENT SNACKBAR

TECHNICAL FIELD

This disclosure relates generally to the use of inline cards and snackbars in graphical user interfaces, including the transformation of an inline card to a persistent snackbar in a graphical user interface.

DESCRIPTION OF RELATED ART

A graphical user interface (GUI) allows a user to interact with an electronic device via icons on a display of the electronic device. An icon is a graphical representation of a program that may be executed, a system feature that may be implemented or explored, a file that may be opened, a process that may be executed, or another idea that may be performed by the electronic device. As GUIs evolve, a GUI may include various pages, tabs, windows, or other objects to organize icons for interaction, and icons may be of various types and formats to convey information to a user or allow various inputs from the user.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for manipulating a graphical user interface (GUI). The method includes displaying an inline card in a base layer of a GUI. The method also includes receiving an input associated with the inline card. The method further includes generating a transitional object in an overlay of the GUI in response to receiving the input. The overlay is displayed over the base layer, and the transitional object initially covers the inline card. The method also includes, in response to receiving the input, generating a snackbar in the base layer, adjusting the transitional object in the overlay to cover the snackbar, and removing the transitional object from the GUI.

Another innovative aspect of the subject matter described in this disclosure can be implemented in a system for manipulating a GUI. An example system includes one or more processors and a memory storing instructions that, when executed by the one or more processors, cause the system to perform operations. The operations include displaying an inline card in a base layer of a GUI. The operations also include receiving an input associated with the inline card. The operations further include generating a transitional object in an overlay of the GUI in response to receiving the input. The overlay is displayed over the base layer, and the transitional object initially covers the inline card. The operations also include, in response to receiving the input, generating a snackbar in the base layer, adjusting the transitional object in the overlay to cover the snackbar, and removing the transitional object from the GUI.

Without the use of an overlay, a GUI transitioning from displaying an inline card to a corresponding snackbar may appear disjointed to a user such that the user may be confused as to whether the snackbar corresponds to the inline card. Through the use of an overlay, the GUI displays a transition between an inline card and corresponding snackbar that appears jointed to a user. As such, a user recognizes that the snackbar corresponds to the inline card, thus improving the user experience.

In some implementations, the system is further configured to reduce a size of the inline card concurrently with adjusting the transitional object, and the size of the inline card may be reduced to zero. In some implementations, the system is also configured to generate the transitional object to initially appear the same as the inline card. The system may also be configured to fill the transitional object after generating the transitional object. In some implementations, adjusting the transitional object includes one or more of moving the transitional object to be at the same location in the GUI as the snackbar or resizing the transitional object to be the same size as the snackbar. In some implementations, the system is further configured to persist the snackbar until a user input to the snackbar is received. In some implementations, the system is also configured to generate the overlay in response to receiving the input. Removing the transitional object from the GUI may include deleting the overlay.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 3A-3L show a conceptual depiction of a GUI including a base layer and an overlay for transitioning from displaying an inline card to displaying a corresponding snackbar.

Like numbers reference like elements throughout the drawings and specification.

DETAILED DESCRIPTION

Figure 1:
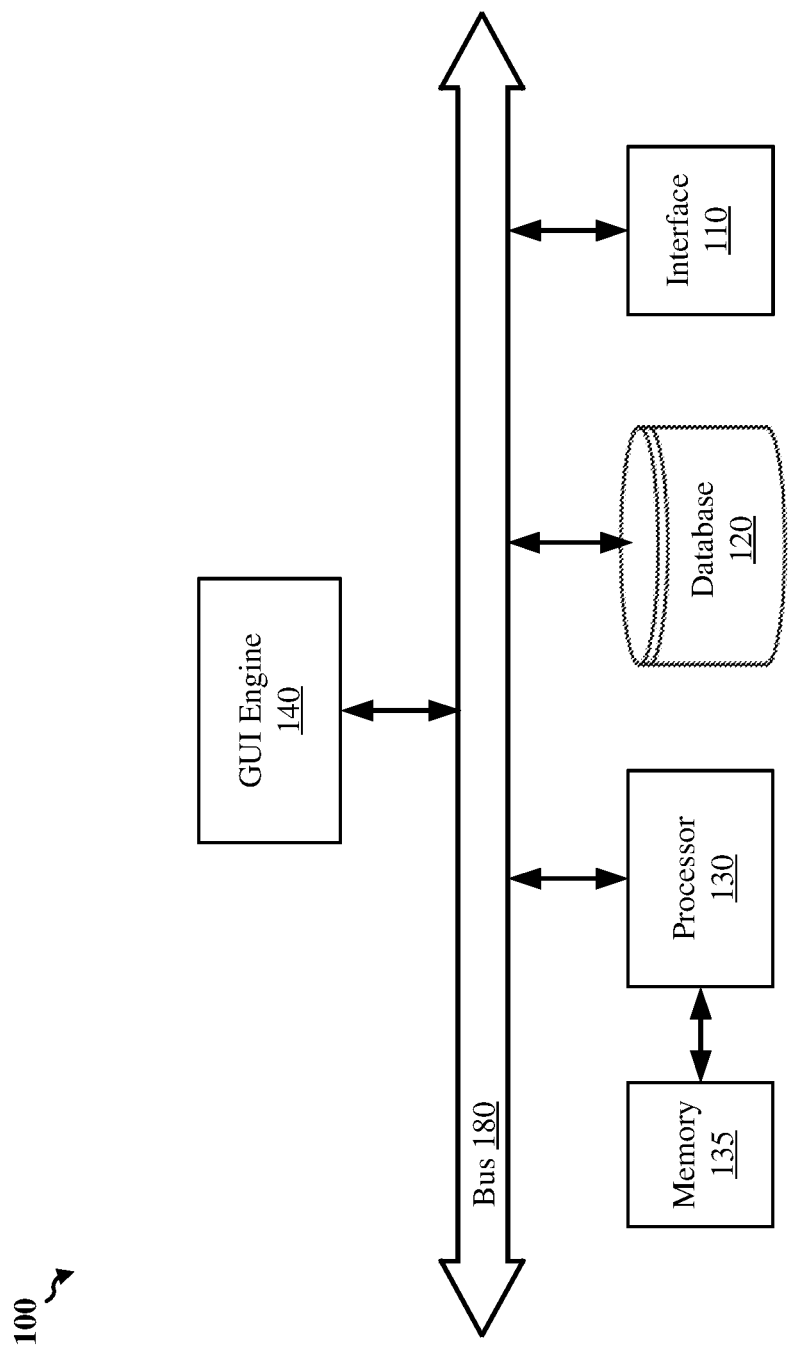
FIG. 1 shows an example system for manipulating a graphical user interface (GUI).

Implementations of the subject matter described in this disclosure may be used for manipulation of a graphical user interface (GUI) to enhance transitioning from displaying an inline card to displaying a corresponding snackbar. A card is a type of icon in the GUI for presenting information to a user. A card may appear similar in shape to a physical playing card from a deck of cards. An inline card is a card presented in a line with other objects in the GUI (such as other cards, text or other information to be displayed in the GUI). For example, a GUI may be configured to allow a user to scroll through a plurality of inline cards, which may be arranged, e.g., vertically or horizontally. A snackbar is an icon that displays information to inform a user of an action that has been performed or will be performed in the future. A snackbar may appear at an edge of the GUI (such as the bottom of the GUI with reference to the orientation of the display) or in another location so as to not interrupt a user's interaction with the electronic device.

A user may interact with a card to cause a process to be executed by an electronic device. For example, a user may tap on a card to cause the electronic device to begin tracking time, to begin performing a hardware performance test, to clear virtual memory of the electronic device, to open an application, or to perform any of thousands of operations that the electronic device may be configured to perform and to which the card corresponds. A snackbar corresponding to the card may be displayed in the GUI to convey information to the user regarding the process being performed. For example, if the card corresponds to the electronic device tracking time, a snackbar may display the amount of time that has passed since the user tapped on the card. In another example, if the card corresponds to performing a hardware performance test, a snackbar may display a percentage of the hardware performance test that has so far been performed. A snackbar is typically generated at its final location in the GUI to prevent disrupting a user's interaction with the GUI. For example, the snackbar may be generated to appear at the bottom of the GUI while the user interacts with the majority of the GUI above the snackbar.

One problem with displaying a snackbar is that, if the user interacts with a card in the GUI and the electronic device is to display a snackbar corresponding to the card in response to the user interacting with the card, the sudden appearance of the snackbar may appear disjointed from the user's interaction with the card. If the appearance of the snackbar appears disjointed from the user's interaction with the card, the user may be confused as to the association between the card and the snackbar, thus diminishing the user experience. As such, there is a need for the GUI to display a transition between displaying the card and displaying the corresponding snackbar in order to illustrate to the user that the snackbar corresponds to the card, thus improving the user experience.

Various implementations of the subject matter disclosed herein provide one or more technical solutions to the problem of disjointedness between displayed objects in a GUI from a user's perspective. As described herein, to illustrate a displayed snackbar as corresponding to a card to a user, a GUI is configured to display a transition between displaying the card and displaying the snackbar. In various implementations, an overlay of the GUI is used to display the transition from an inline card to a corresponding snackbar. In some implementations, the electronic device that displays the GUI displays an inline card in a base layer of the GUI and receives an input associated with the inline card. In response to receiving the input, the electronic device generates a transitional object in an overlay of the GUI (with the overlay being displayed over the base layer and the transitional object initially covering the inline card), adjusts the transitional object in the overlay to cover the snackbar, and removes the transitional object from the GUI. As described below, the overlay in the GUI may hide portions of a base layer of the GUI (such as an inline card or a snackbar) as well as show an animation that appears to transition an inline card to a snackbar. Through the use of an overlay, significant changes or various versions of a base layer to depict changes in the GUI are not required to be generated. In addition, the use of the overlay allows an animation of the transition to be adjusted without requiring adjustment to the underlying base layer portion of the GUI. In this manner, the GUI, which is configured to show a transition linking an inline card to a corresponding snackbar, becomes more easily updated and managed.

Various aspects of the present disclosure provide a unique computing solution to a unique computing problem that did not exist prior to the creation of GUIs for electronic devices (such as laptops, desktops, smartphones, tablets, etc.). In particular, the implementations described herein provide a unique computing solution to a unique computing problem associated with the visual appearance of linking objects in a GUI in order to improve a user experience with the GUI. As such, implementations of the subject matter disclosed herein are not an abstract idea such as organizing human activity or a mental process that can be performed in the human mind.

FIG. 1 shows an example system 100 for manipulating a GUI, according to some implementations. The system 100 includes an interface 110, a database 120, a processor 130, a memory 135 coupled to the processor 130, and a GUI engine 140. In some implementations, the various components of the system 100 may be interconnected by at least a data bus 180, as depicted in the example of FIG. 1. In other implementations, the various components of the system 100 may be interconnected using other suitable signal routing resources.

The system 100 may be or may be included in any suitable electronic device configured to generate a GUI for interacting with a user. Example electronic devices that may include or may be the system 100 include a desktop computer, a laptop computer, a smartphone, a tablet, a personal digital assistant, or another suitable device with a display configured to display a GUI.

The interface 110 may be one or more input/output (I/O) interfaces to receive one or more inputs, such as user inputs or inputs from other electronic devices or other device components. The interface 110 may also provide a GUI to be displayed. The interface may also be used to receive or send other information associated with the operation of the system 100 (such as information associated with one or more other software programs executed by the system 100). The interface 110 may include a display (which may include a touch sensitive display), a speaker, a mouse, a keyboard, or other suitable input or output elements that allow interfacing with the user. In this manner, the system 100 may be configured to display a GUI and receive user inputs in interacting with the GUI. An example GUI, including one or more inline cards and a snackbar of the GUI, is described in more detail below with reference to FIGS. 2A-2W and 3A-3L. The interface 110 may also include one or more wired or wireless connections for interaction with one or more other electronic devices. For example, the interface 110 may include a wireless interface (such as a Wi-Fi or cellular interface) in order to connect to the internet or to one or more other electronic devices.

The database 120 may store information associated with the system 100, such as one or more documents or files. In some implementation, the database 120 may also store software of the GUI engine 140.

The processor 130 may include one or more suitable processors capable of executing scripts or instructions of one or more software programs stored in system 100 (such as within the memory 135 or the database 120). For example, the processor 130 may be capable of executing one or more applications or the GUI engine 140. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration). In some implementations, the processor 130 may include an application processing unit and a graphics processing unit.

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications or the GUI engine 140 that may be executed by the processor 130. The memory 135 may also store any other data for operation of the system 100, such as intermediate outputs by the processor 130 during execution of one or more applications by the processor 130. In some implementations, hardwired circuitry may be used in place of, or in combination with, software instructions to implement aspects of the disclosure. As such, implementations of the subject matter disclosed herein may not be limited to any specific combination of hardware circuitry and/or software.

The GUI engine 140 generates the GUI to be displayed to a user and manages the GUI in response to one or more inputs from a user or a device component. For example, the GUI engine 140 may generate a GUI to include a clock that displays the current time. The GUI engine 140 may receive an input from an internal clock or from an external clock via the interface 110 and update the clock in the GUI to display the current time. In another example, the interface may include or be coupled to a touch sensitive display. The GUI engine 140 may update the GUI based on one or more user inputs to the display (such as tapping, pressing and holding, swiping, or other user gestures from a user's finger, a stylus, or another input device) as received by the interface 110. For example, the GUI engine 140 may highlight an icon in the GUI based on the user tapping on the portion of the display displaying the icon. As used herein, a user input to an icon or other object of a GUI refers to a user tapping, or using a user input device to interact with, a portion of the display displaying the icon or other object. A user input device may include a mouse, a keyboard, a stylus, an eye tracker, or another suitable input device to be used by a user to provide user input.

While the GUI engine 140 is depicted as a separate component from processor 130 and memory 135 of the system 100 in FIG. 1, the GUI engine 140 may be included in software including instructions stored in memory 135 or the database 120. For example, a GUI engine 140 may be a web browser, a smartphone application, a graphic component of an application to generate a GUI associated with the application, or another suitable software component. As such, the GUI engine 140 generating a GUI or performing operations associated with the GUI may refer to the processor 130 generating the GUI or performing the operations by executing software of the GUI engine 140. Additionally or alternatively, the GUI engine 140 may include application specific hardware (e.g., one or more ASICs) or a combination of hardware and software to perform operations described herein. As such, the particular architecture of the system 100 shown in FIG. 1 is but one example of a variety of different architectures within which aspects of the present disclosure may be implemented.

Any suitable programming language may be used to program the GUI. For example, Material Design from Google® (which is a Google Android®-oriented design language) may be used to generate the GUI to support touch experiences in an application of the Android operating system (OS) for a smartphone, tablet, Chromebook®, or other suitable Android or Chrome® OS device. However, the GUI may be programmed for any suitable OS (such as iOS by Apple®, Microsoft® Windows, etc.) and using any suitable design tools.

The GUI to be generated by the system 100 (such as the GUI engine 140) may include a plurality of icons to be displayed at various times and for various circumstances. The icons include one or more inline cards and one or more snackbars. At least one snackbar corresponds to an inline card of the GUI. The system 100 is configured to transition between displaying the inline card and the corresponding snackbar in the GUI in order to illustrate to a user that the snackbar corresponds to the inline card, thus preventing the icons from appearing disjointed.

Figure 2A:
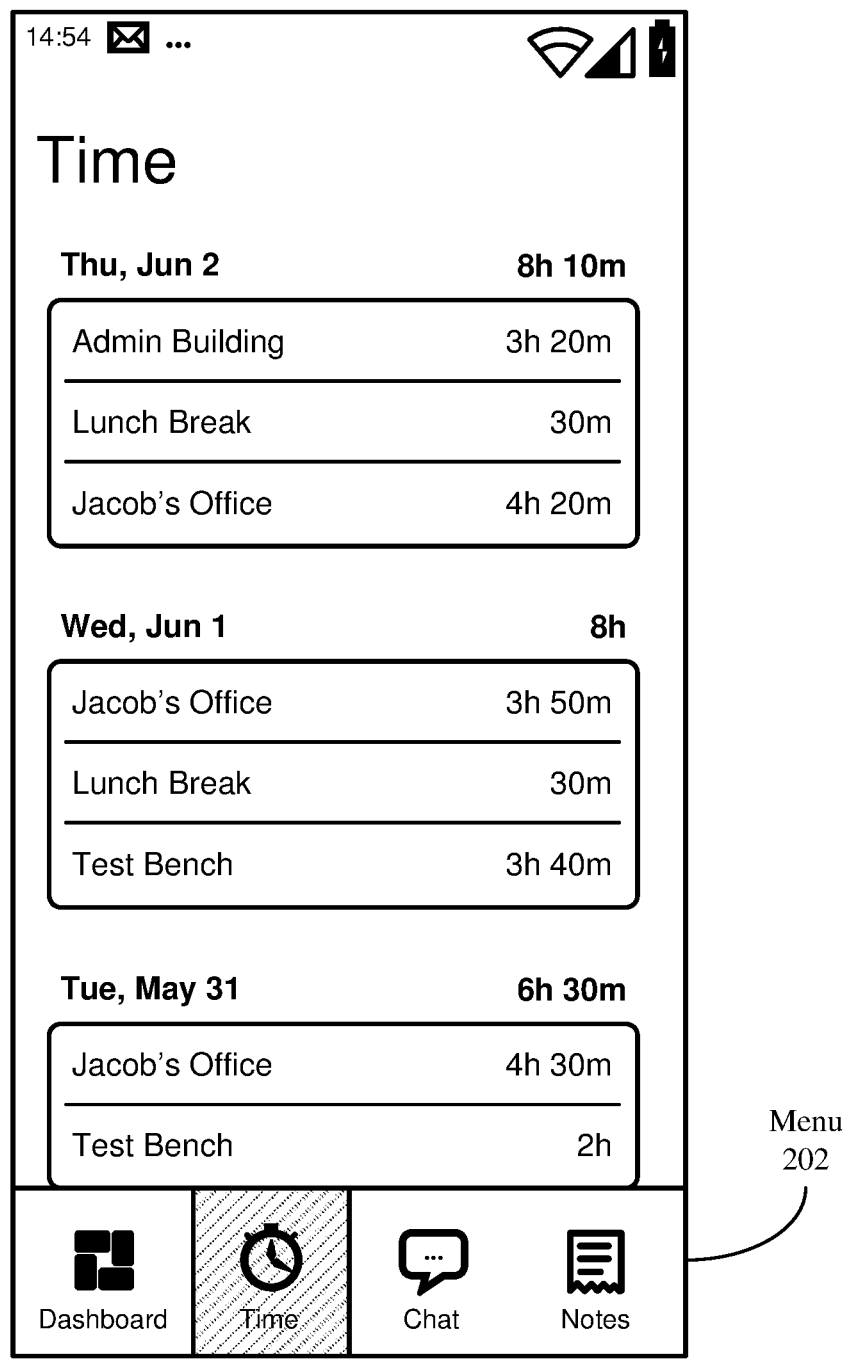
FIGS. 2A-2W show an example GUI transitioning from displaying an inline card to displaying a corresponding snackbar.
Figure 2B:
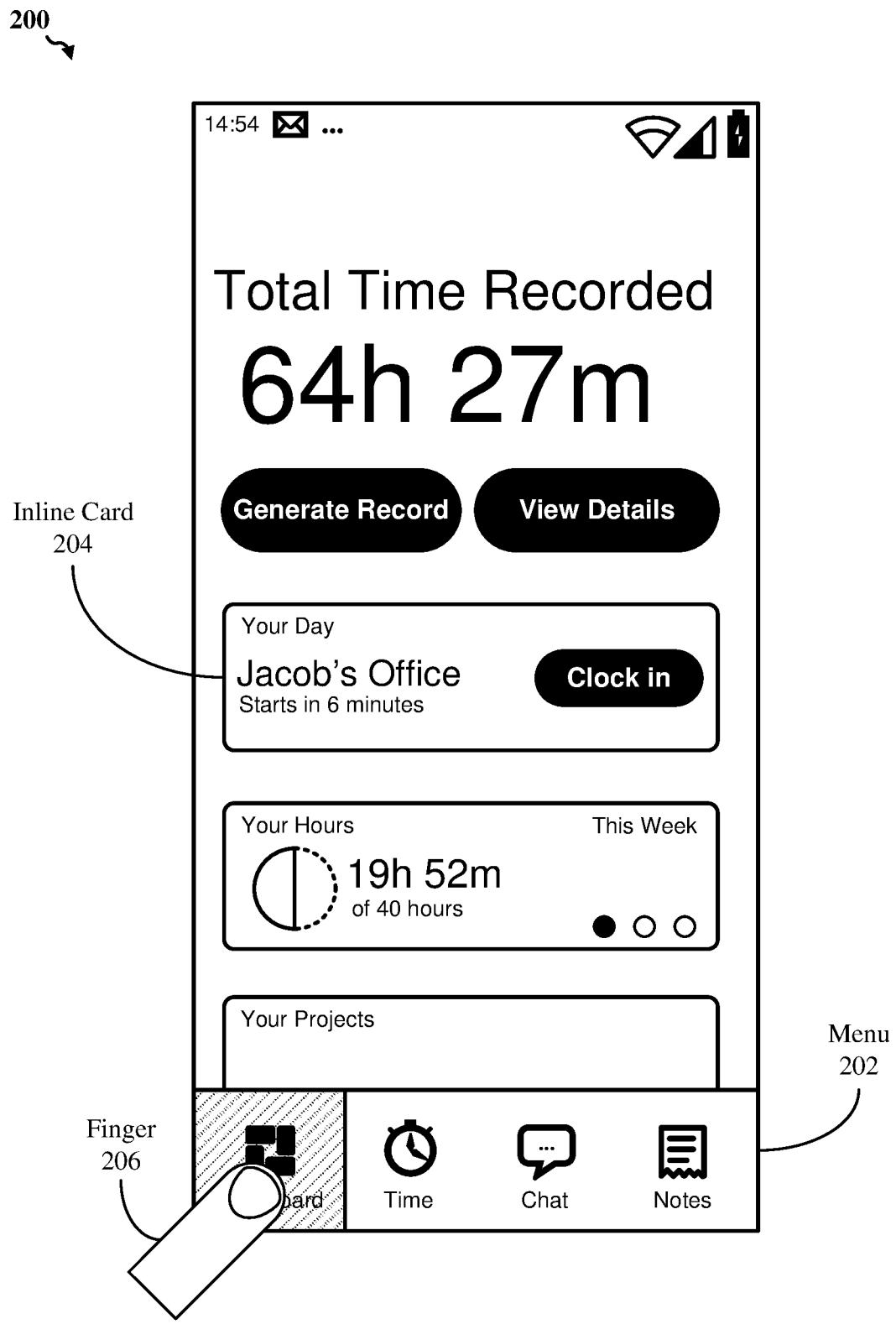
Figure 2C:
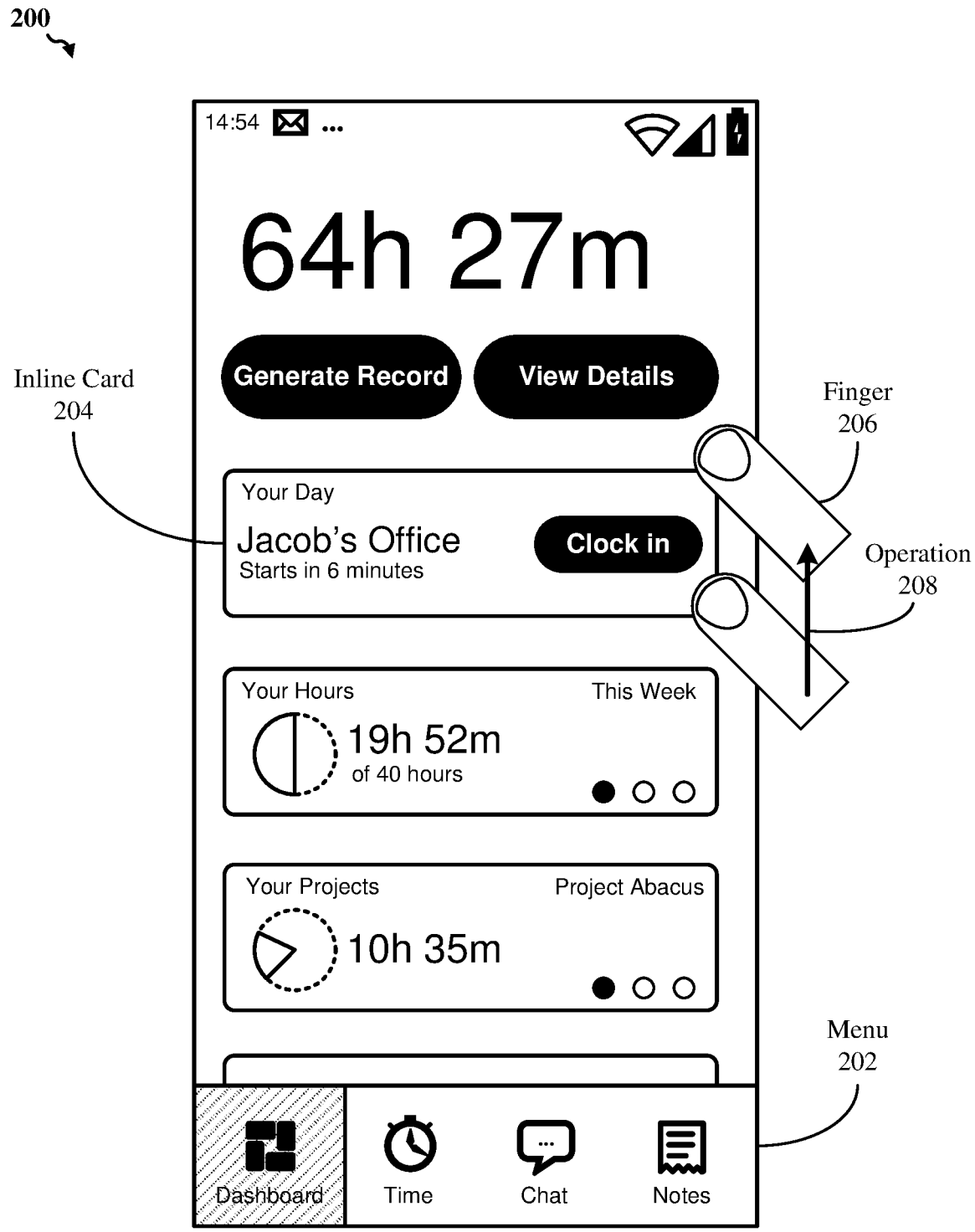
Figure 2D:
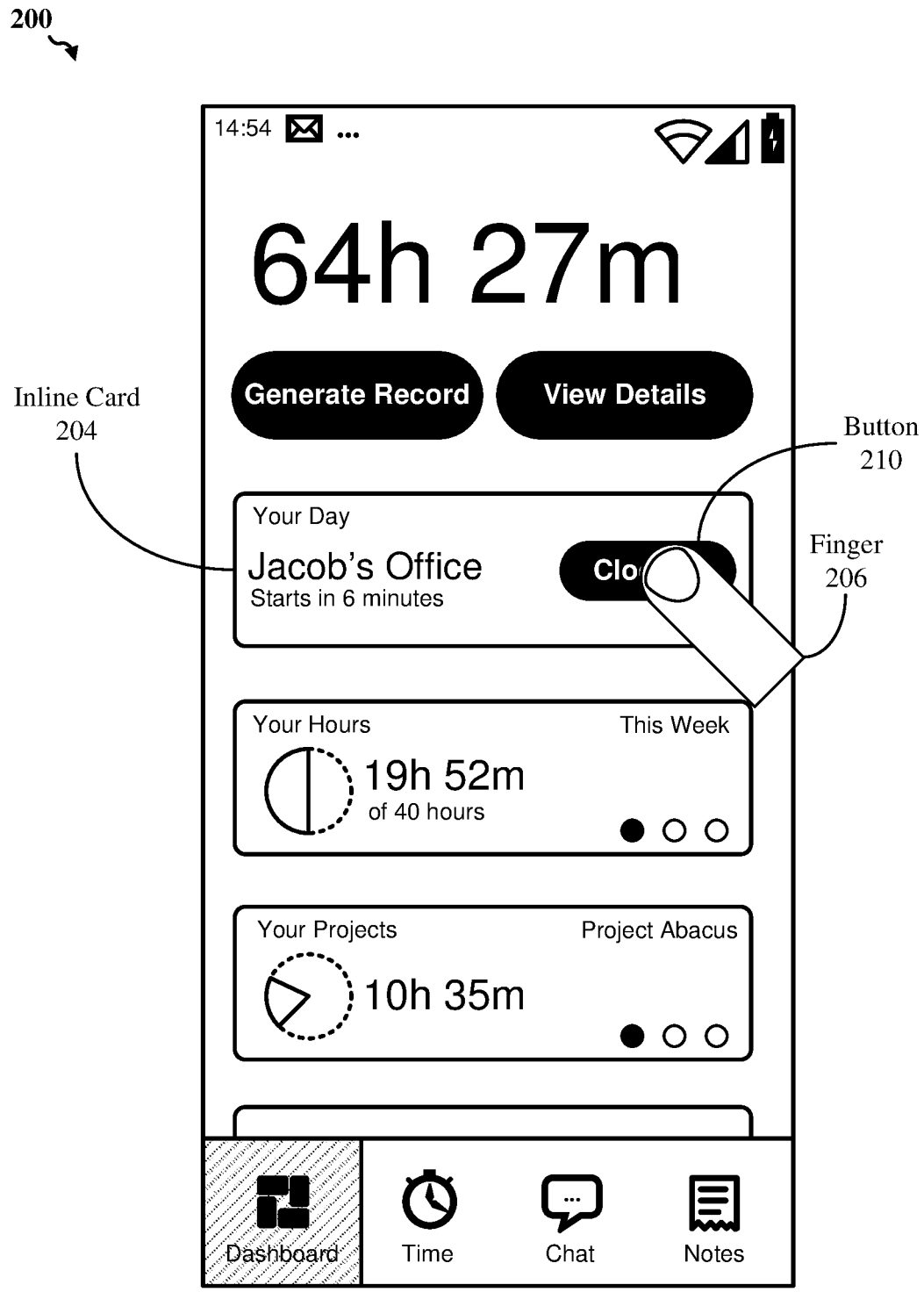
Figure 2E:
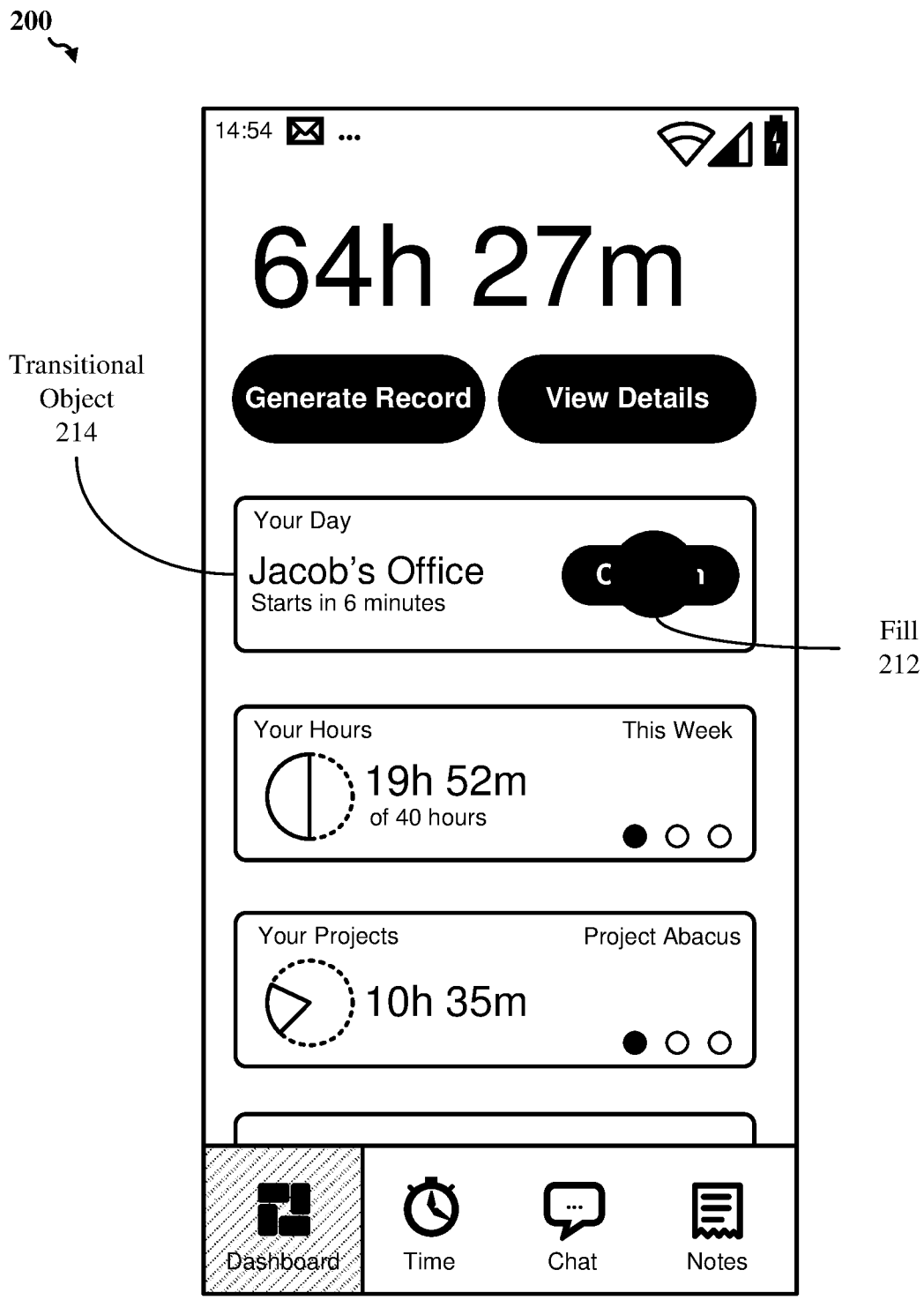
Figure 2F:
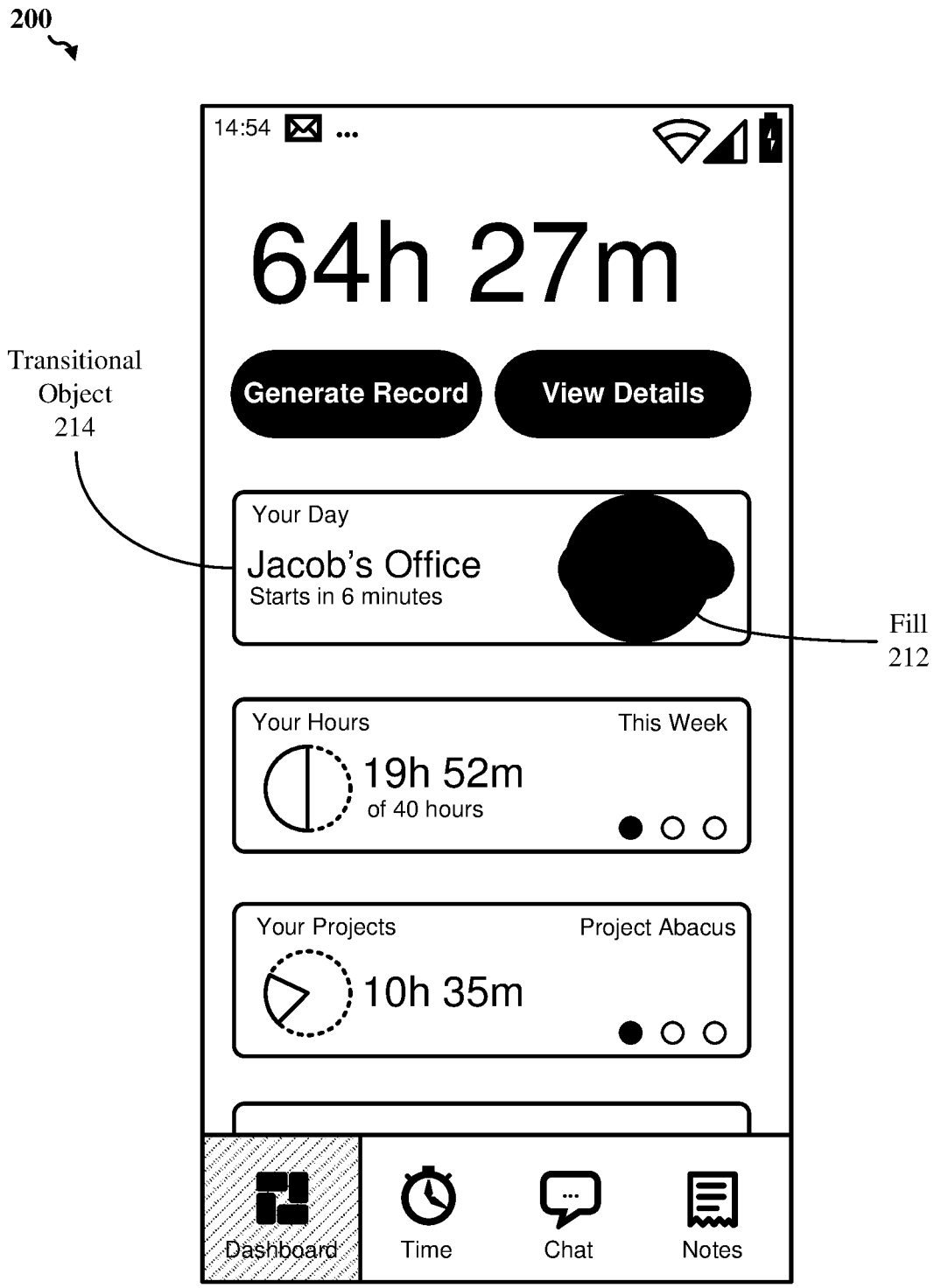
Figure 2G:
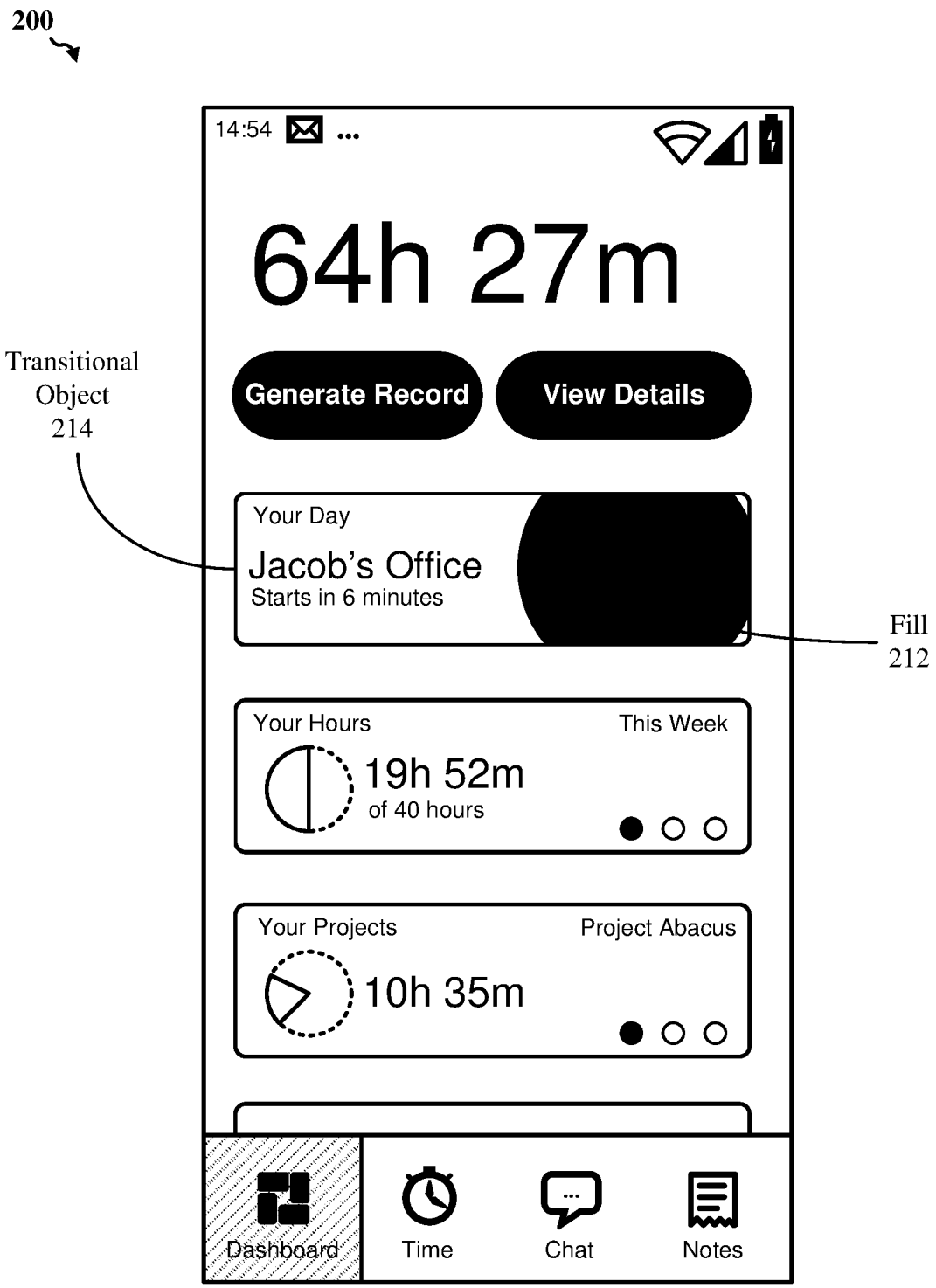
Figure 2H:
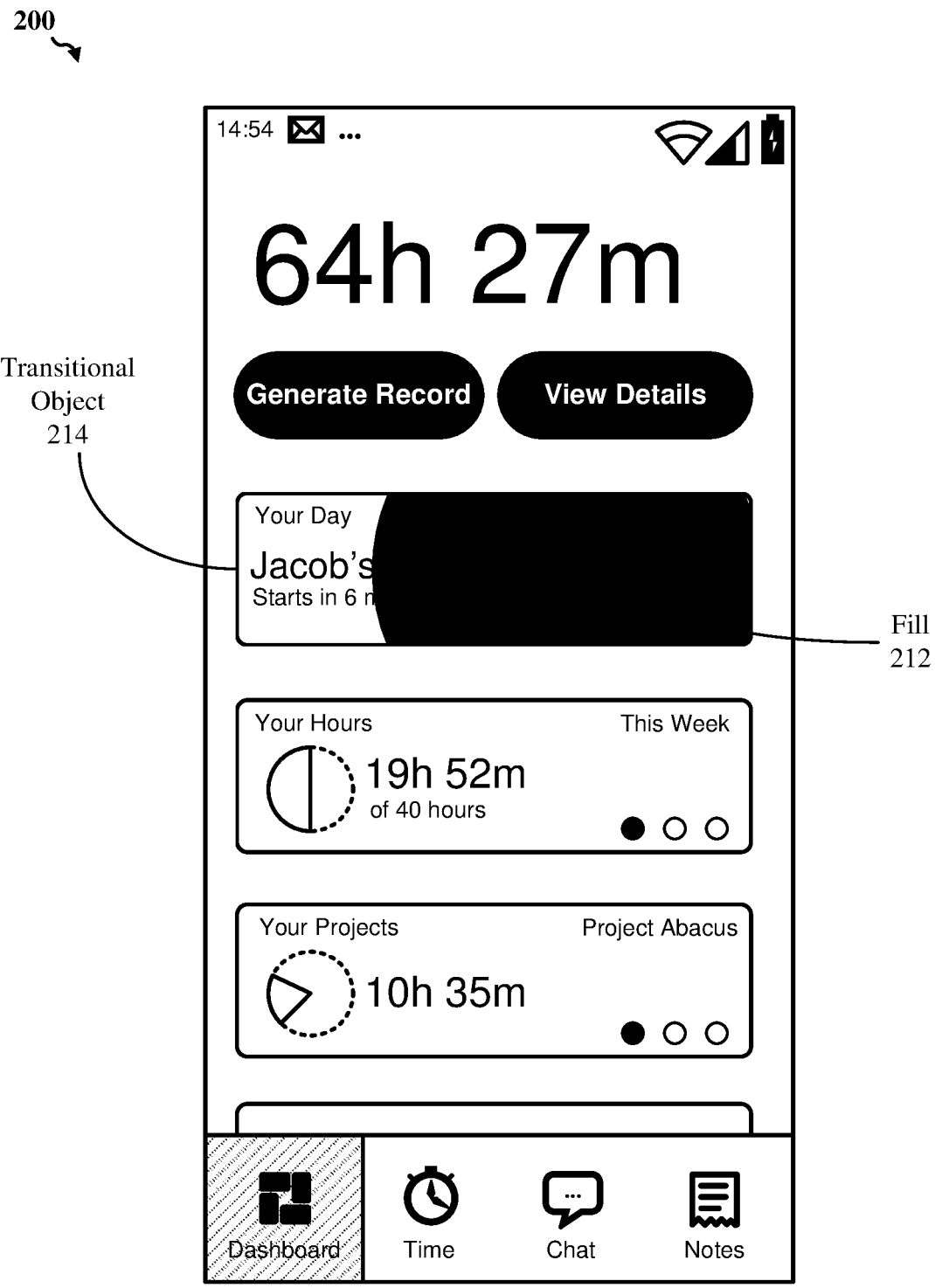
Figure 2J:
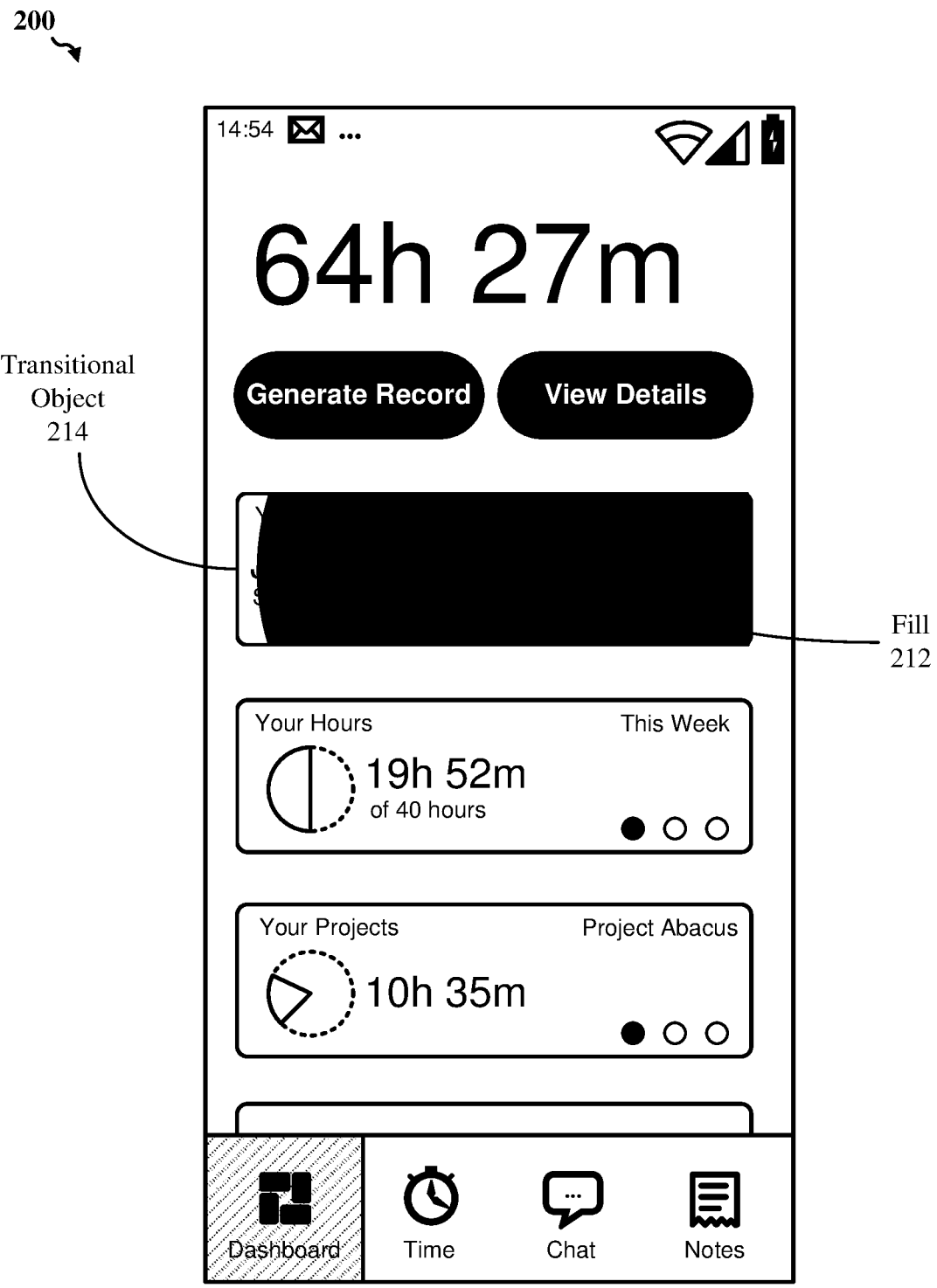
Figure 2K:
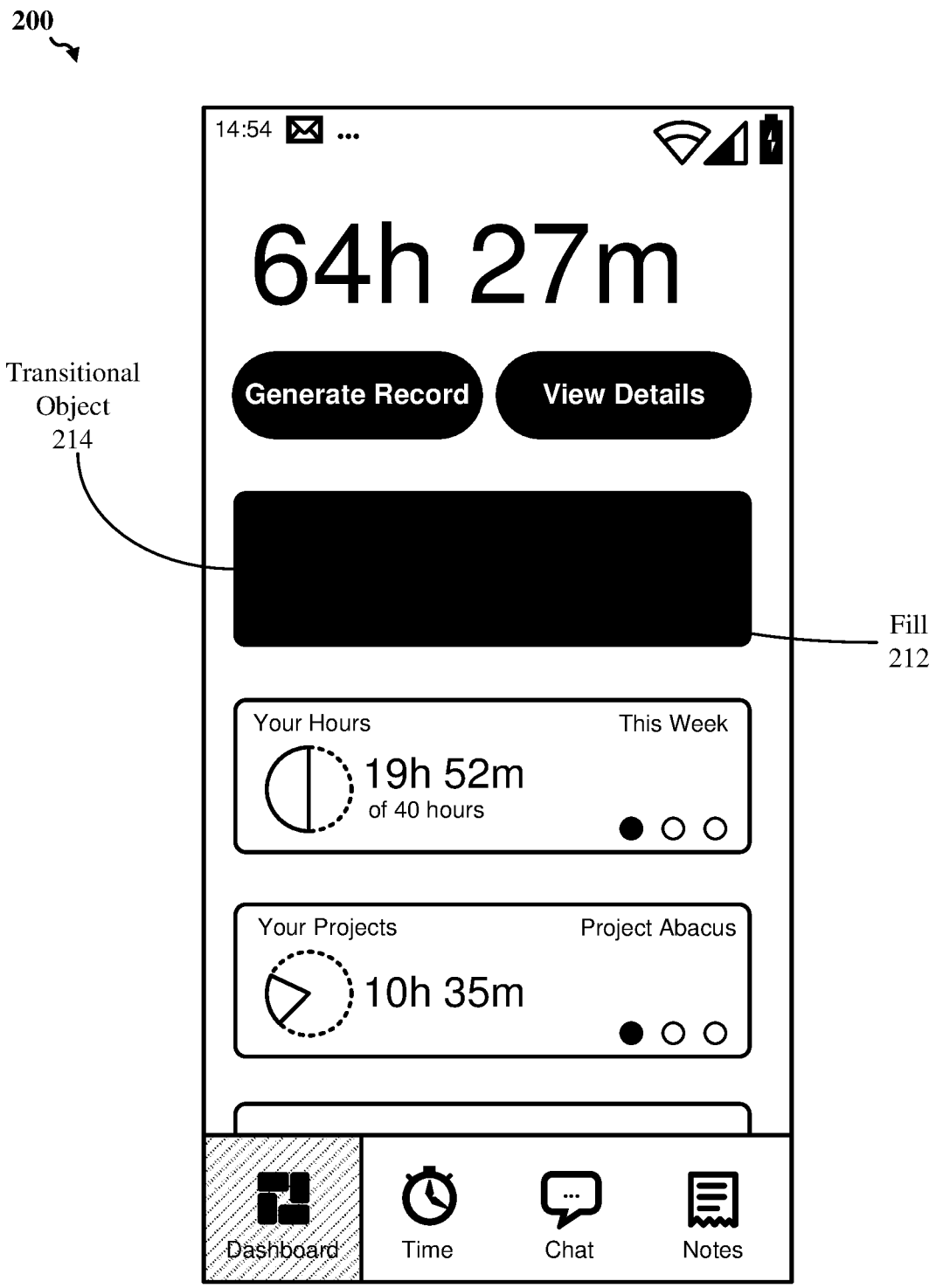
Figure 2L:
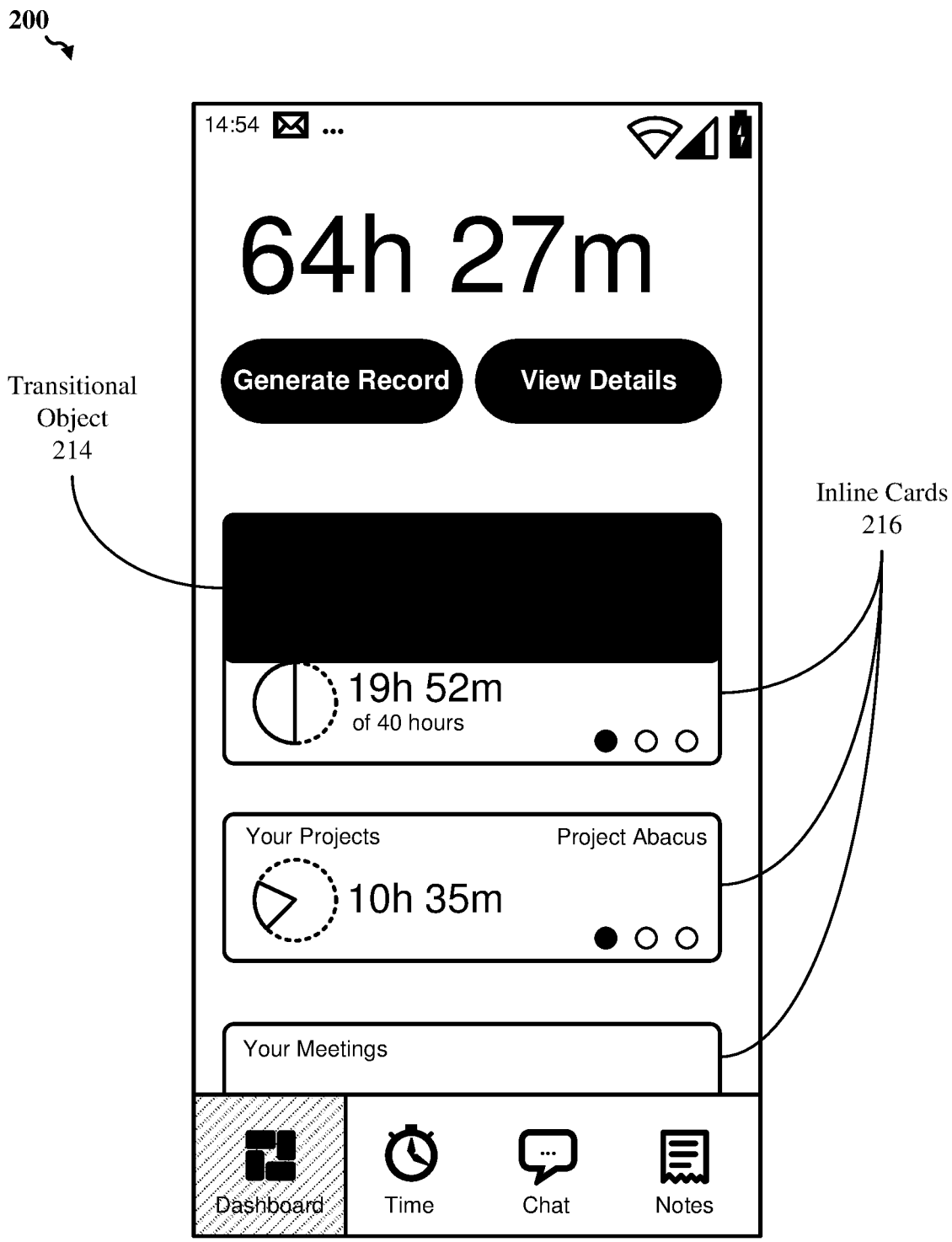
Figure 2M:
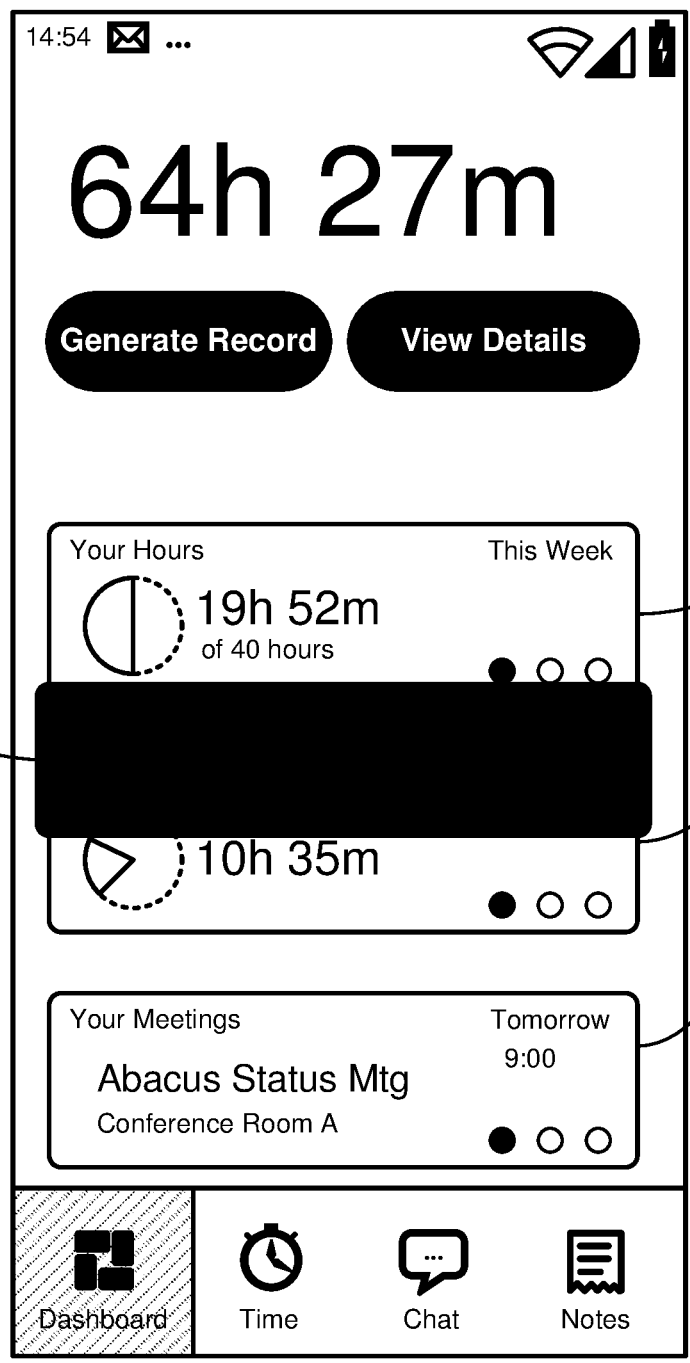
Figure 2N:
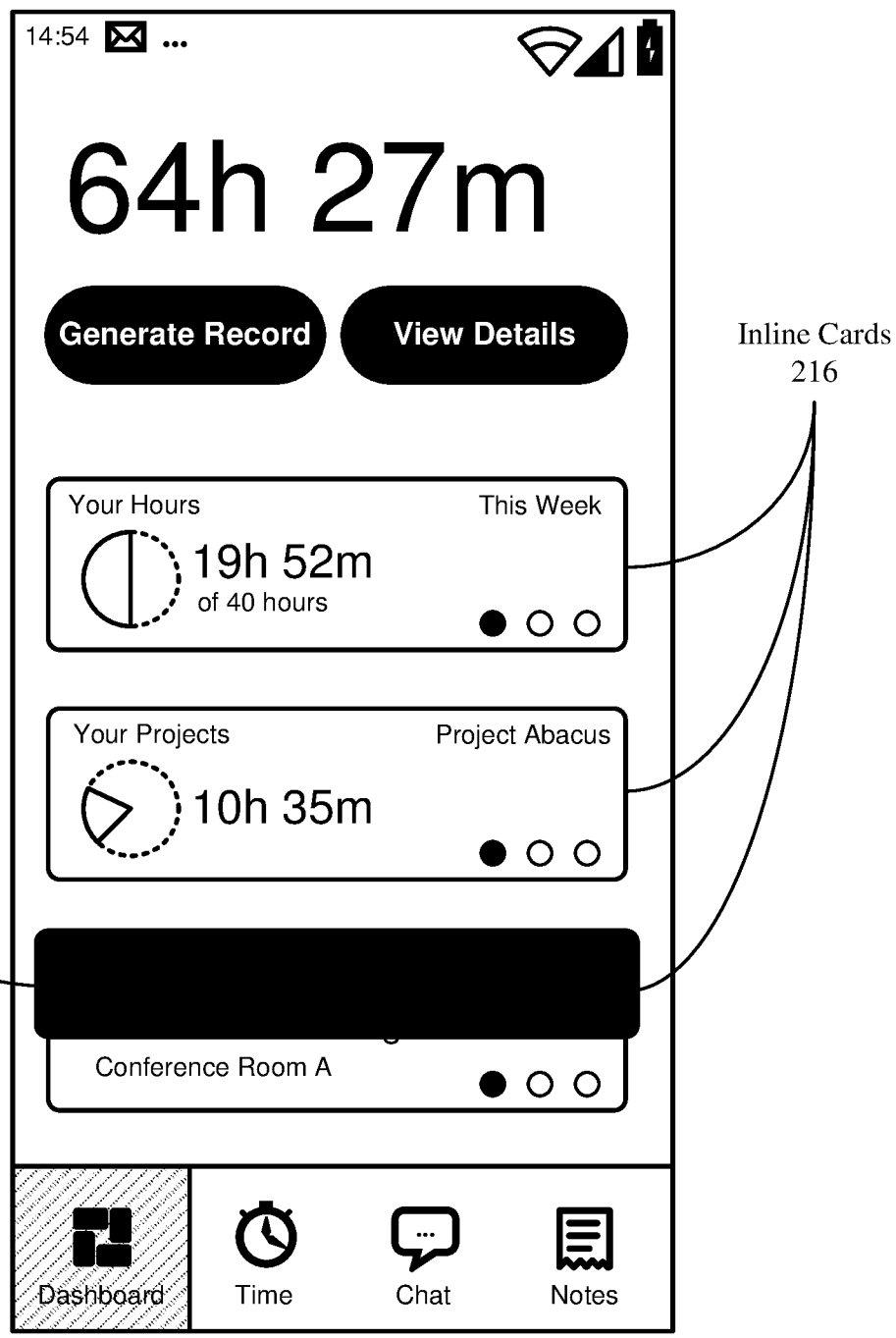
Figure 2P:
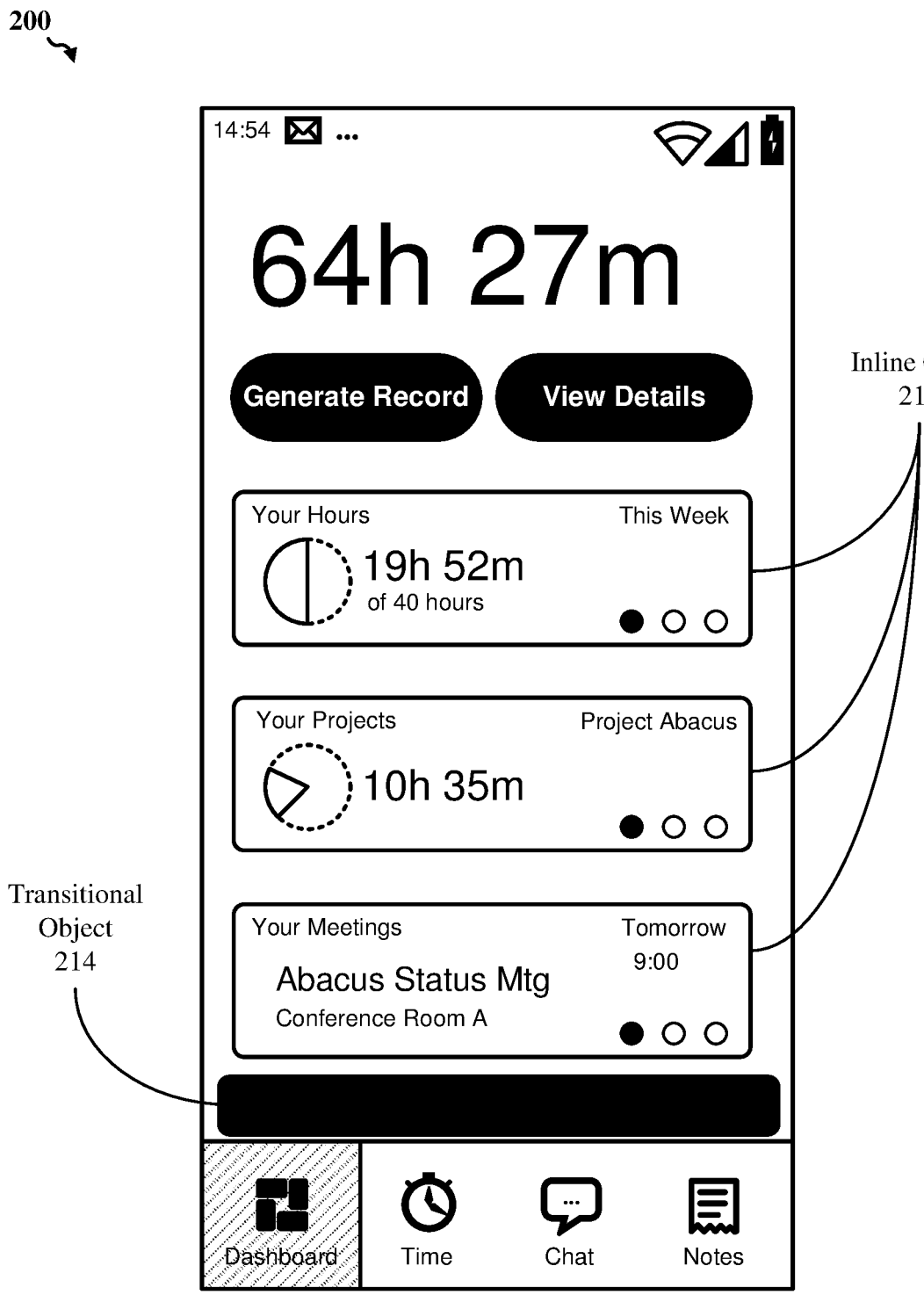
Figure 2Q:
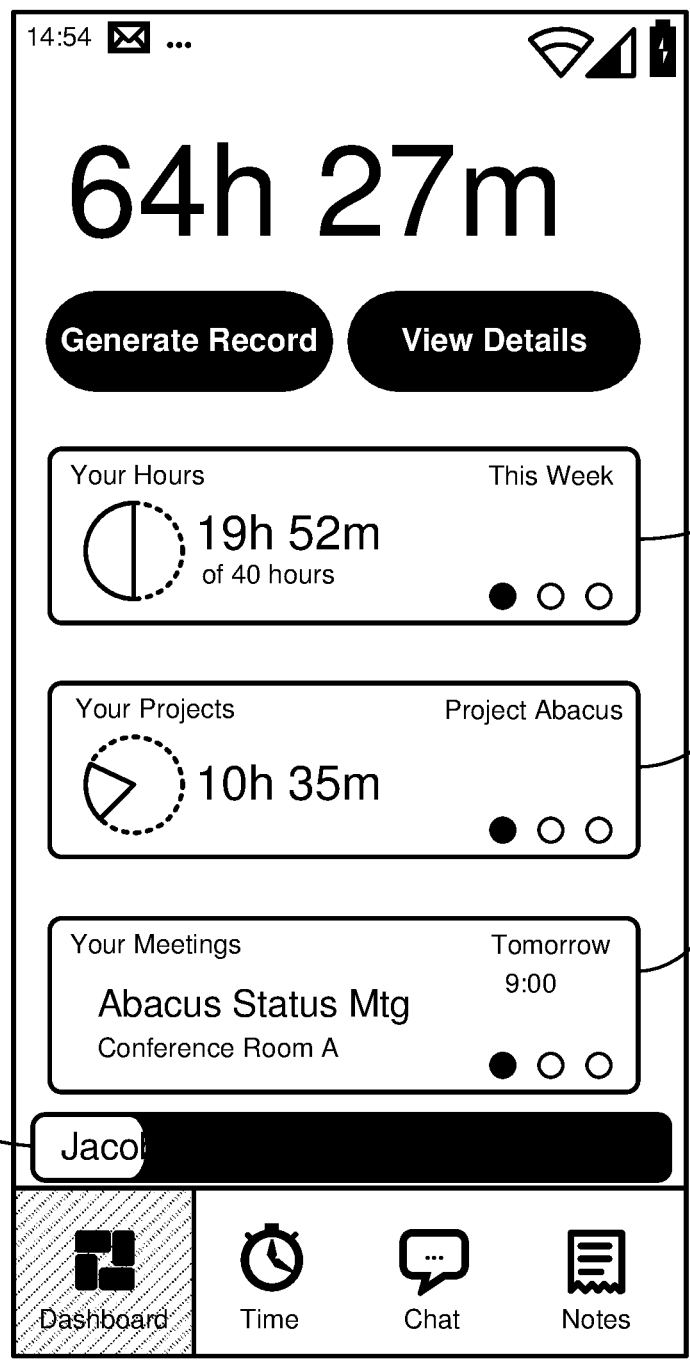
Figure 2R:
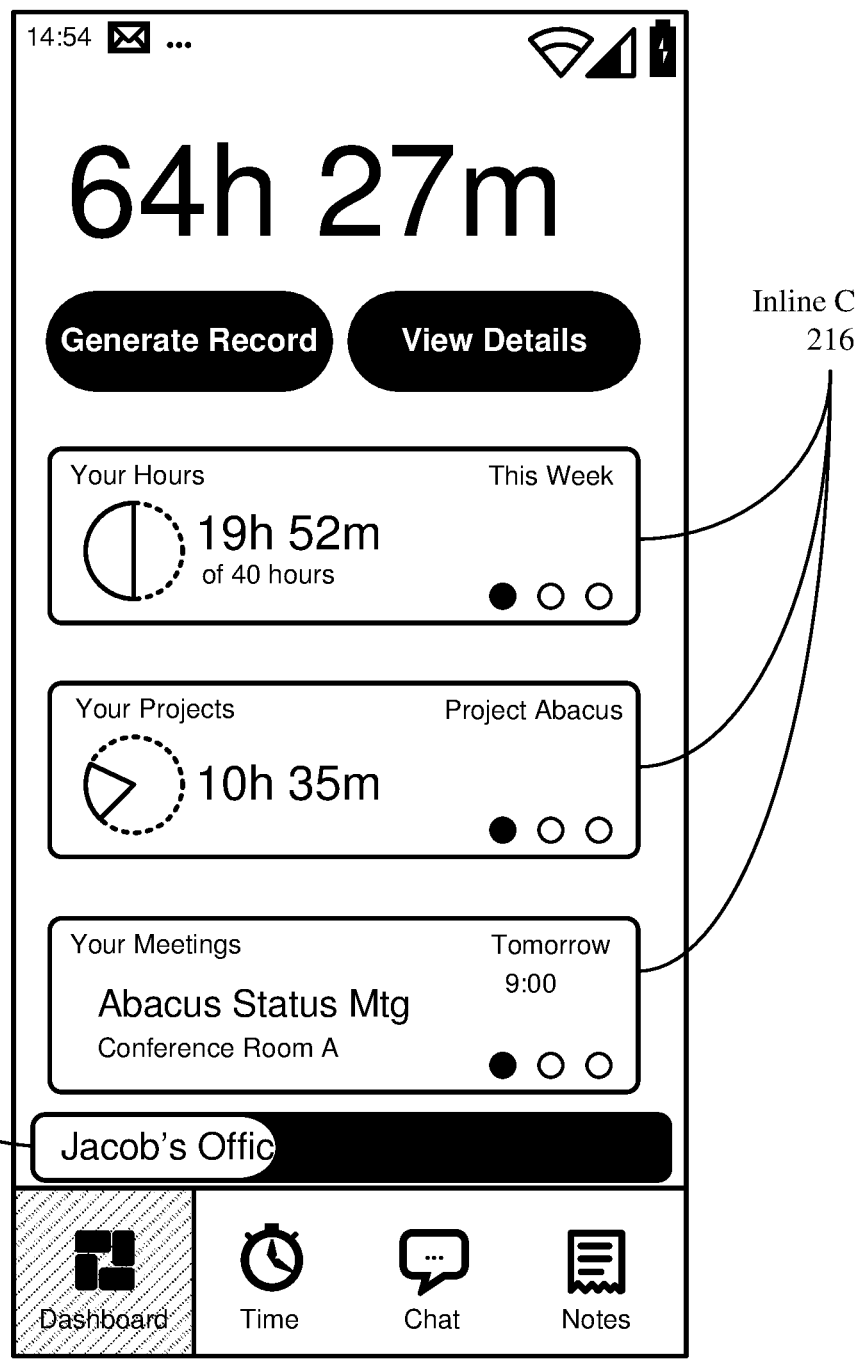
Figure 2S:
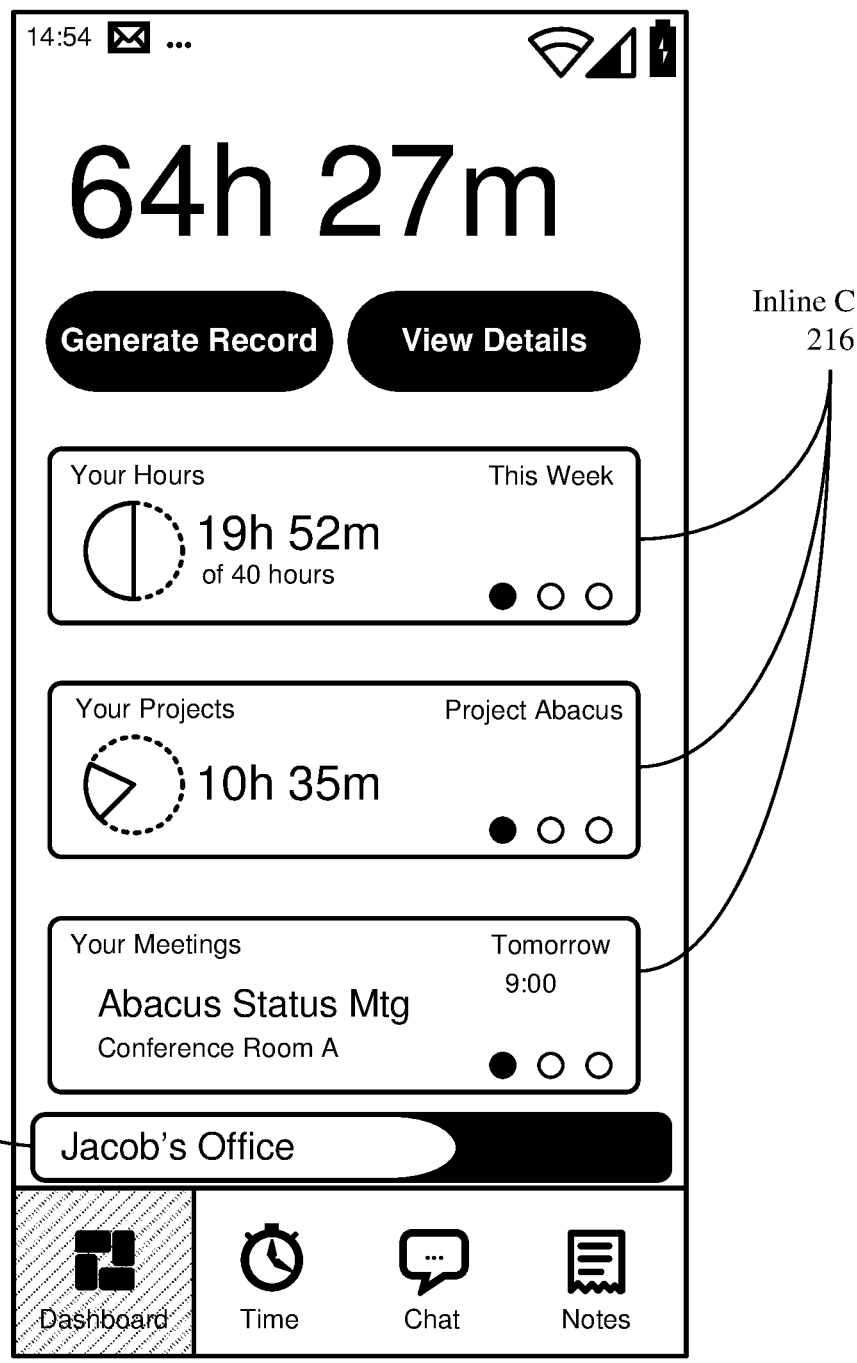
Figure 2T:
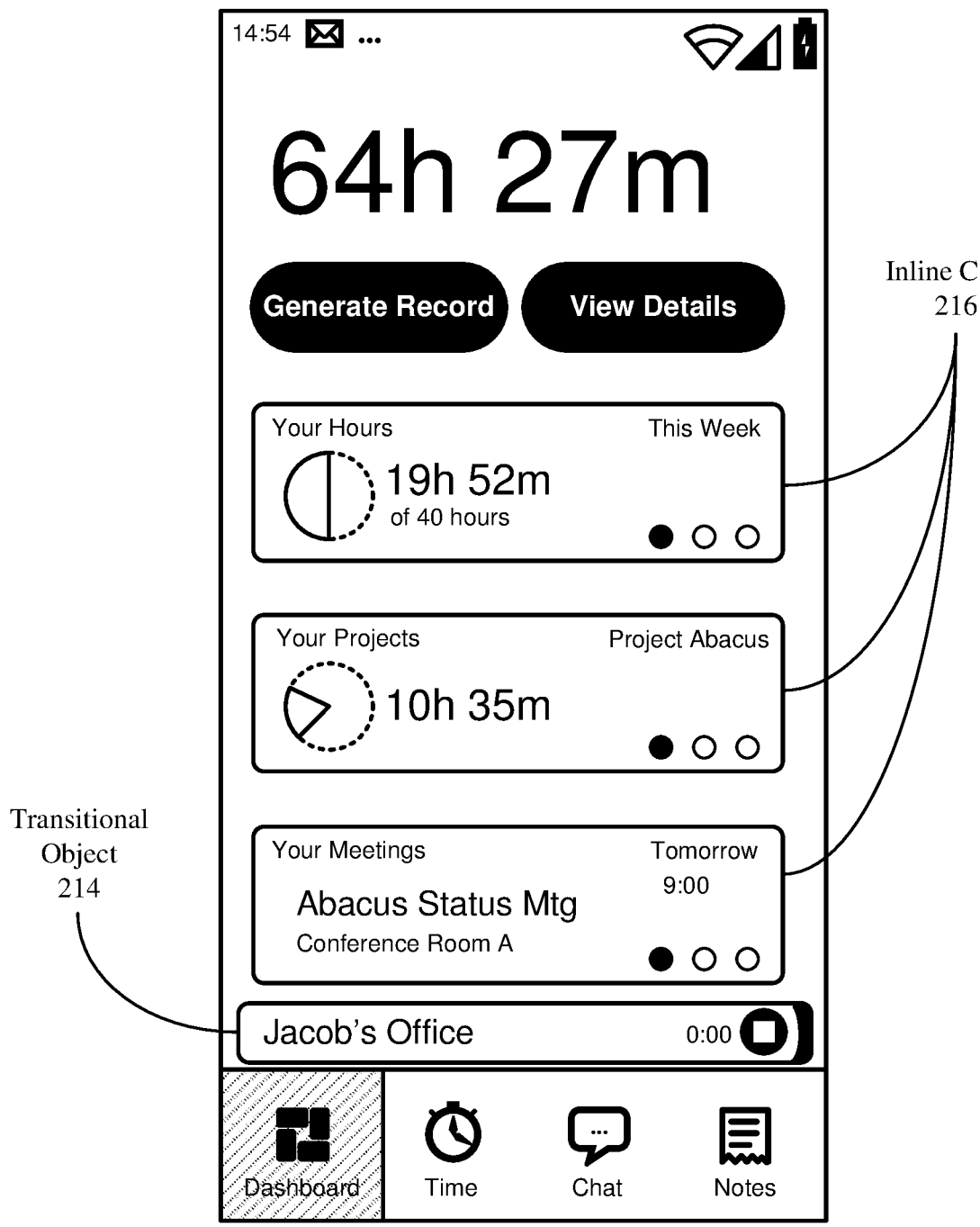
Figure 2U:
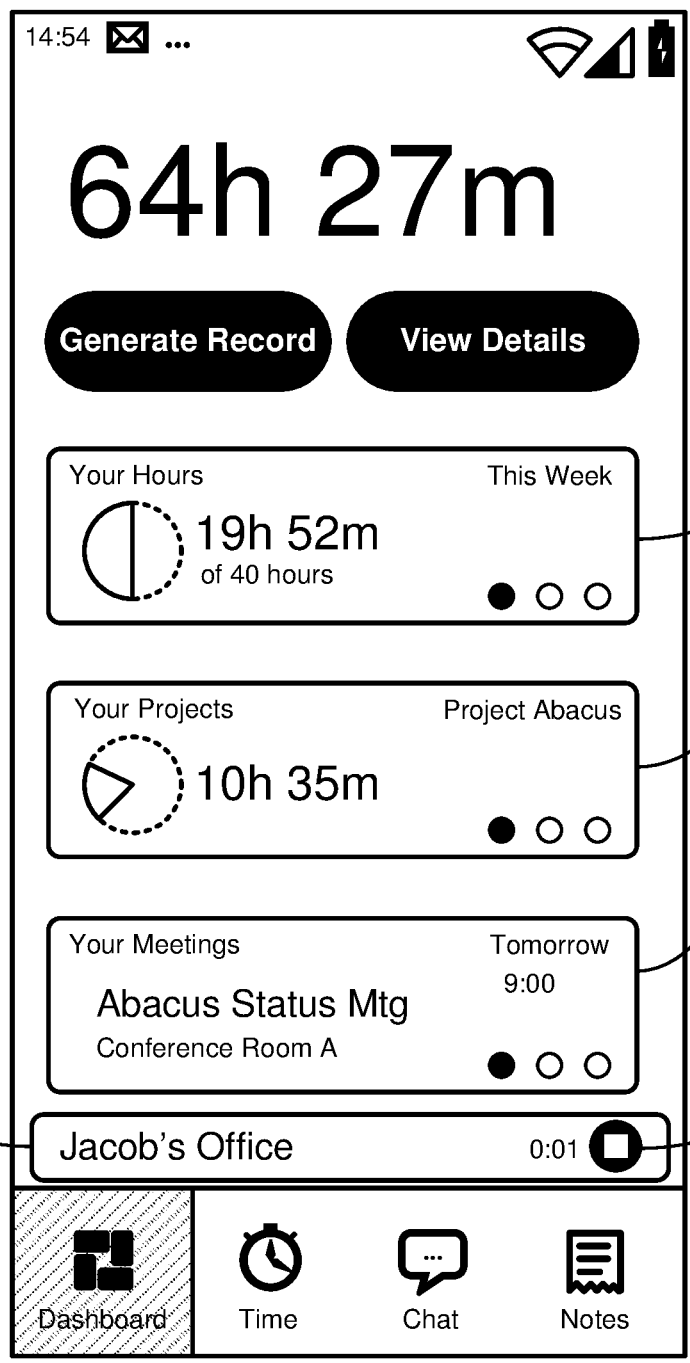
Figure 2V:
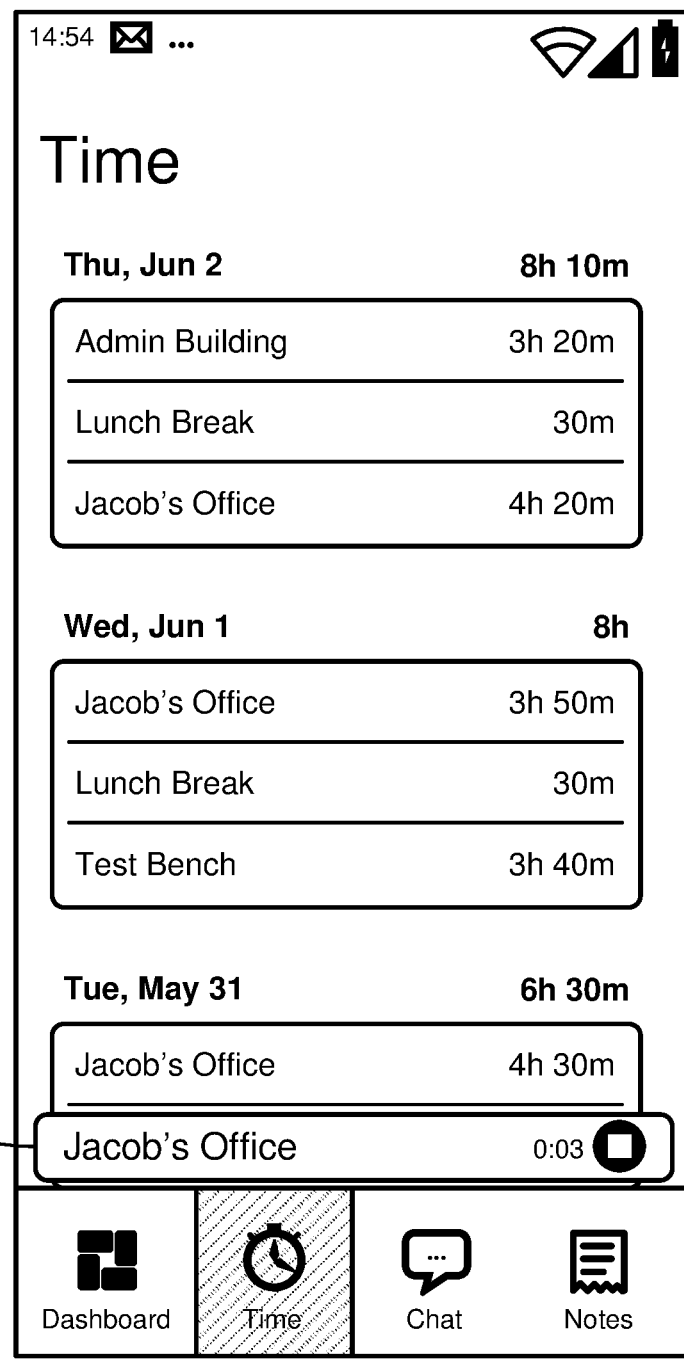
Figure 2W:
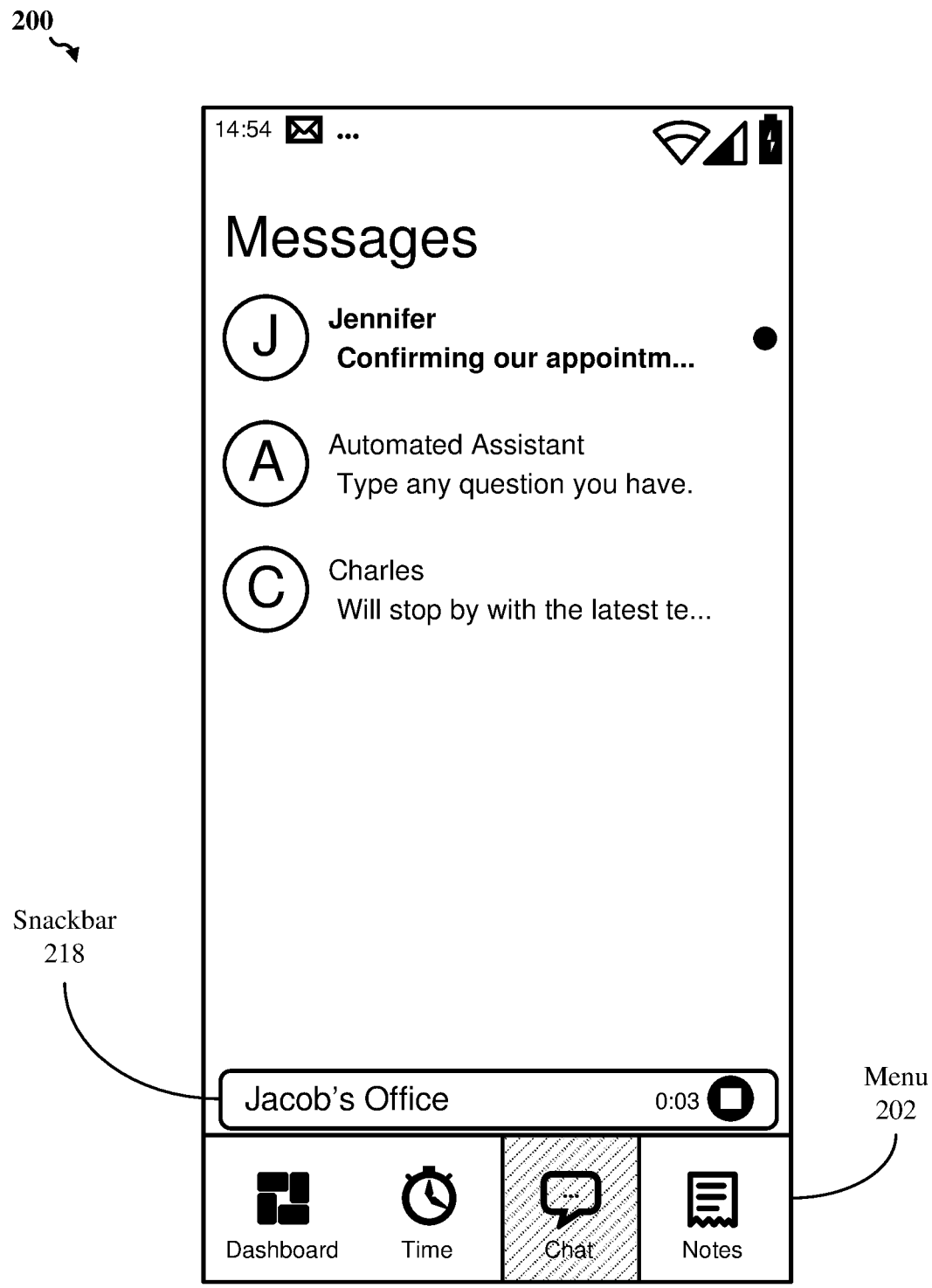

FIGS. 2A-2W show an example GUI 200 transitioning from displaying an inline card 204 to displaying a corresponding snackbar 218. The GUI 200 is an example of a GUI generated by the GUI engine 140. In the example, the GUI 200 is displayed on a display of an electronic device (such as a smartphone). The GUI 200 is depicted as being associated with a timekeeping application for the user (such as to track time spent on various projects).

Referring to FIG. 2A, the GUI 200 includes various icons displayed on the top of the display to indicate, e.g., battery level, cellular connectivity, Wi-Fi connectivity, notifications, and the current time. Such icons may persist on the display across various applications or states of the electronic device. For example, if a smartphone switches between applications displayed, the icons at the top of the smartphone may be displayed for both applications. The GUI 200 also includes a menu 202 to indicate various pages of a timekeeping application that may be accessed. In the example, the menu 202 persists while the GUI of the timekeeping application is displayed. As depicted in FIG. 2A, the time button of the menu 202 is selected, indicating that the time page of the GUI for the timekeeping application is displayed above the menu 202. The time page shows time spent on various items and total time spent per day for past days during which the timekeeping application is used.

FIG. 2B shows the GUI 200 with the dashboard button of the menu 202 being selected. The display receives a user input based on the user's finger 206 touching the dashboard button. In response to receiving the user input the electronic device generates the dashboard page of the GUI for the timekeeping application. As depicted, the example dashboard page provides a summary of timekeeping information, including total amount of time recorded, amount of time recorded per week, amount of time recorded per project, and so on. As depicted, the dashboard page may also include one or more buttons to perform additional actions.

The dashboard page of the GUI includes an inline card 204. The user may interact with the inline card 204, such as to begin tracking time based on the user tapping on the card 204 or a specific portion of the card 204 (such as a button in the card). In comparing FIGS. 2A and 2B, the inline card 204 is displayed when the dashboard page is displayed but not when the time page is displayed in the GUI.

FIG. 2C shows the GUI 200 including a plurality of inline cards and other objects (such as text) vertically organized in the dashboard page. The finger 206 may be used to perform a drag or swipe operation 208 to scroll up and down through the cards or other objects (which includes the inline card 204). As depicted, the menu 202 may remain static in the GUI while the cards and other objects scroll up and down. While the cards and objects are depicted as being vertically organized, the cards and objects may be organized in any suitable manner. For example, if the smartphone is placed into a landscape orientation, the GUI 200 may be adjusted to organize the cards and objects horizontally. In this manner, scrolling may be performed by the finger 206 swiping or dragging left or right.

FIG. 2D shows finger 206 being used to select button 210 of the inline card 204 to indicate that time is to begin being recorded. In some other implementations, time may begin to be recorded based on another input, such as the user selecting somewhere else on the inline card 204, the clock reaching 15:00 or another time associated with when timekeeping is to begin, or another suitable user or device input.

In response to the user selecting button 210, the GUI 200 is to transition from displaying the inline card 204 to displaying a snackbar 218 corresponding to the inline card 204. FIGS. 2E-2U depicts an animation from the perspective of the user of an example transition from displaying the inline card 204 to displaying the corresponding snackbar 218. The FIGS. 2E-2U are depicted in the order as would be displayed by the GUI 200. The transition depicted in the animation shows the correlation between the inline card including the selected button 210 and the corresponding snackbar 218 that is displayed after the user selects button 210.

FIG. 2E shows a transitional object 214 that appears the same as the inline card 204. The transitional object 214 is a temporary object to be used during the animation to show the correlation between the inline card 204 and the snackbar 218. As described in more detail below, the transitional object 214 may be generated to cover the inline card 204 (such as by being part of an overlay displayed over a base layer of the GUI 200 including the inline card 204). While the transitional object 214 is depicted as initially appearing the same as the inline card 204 in the GUI 200, the transitional object 214 may be any suitable object of the GUI 200 to cover the inline card 204.

After the transitional object 214 is displayed, the transitional object 214 may be filled (depicted by fill 212) to indicate to the user that the input to the inline card 204 is received for time to begin being recorded. The fill may be any suitable color, pattern, or another suitable highlighting of the transitional object 214 (or another suitable indication) indicating to the user that the input was received.

FIGS. 2F-2K show a portion of the animation corresponding to fill 212 spreading through an increasing amount of the transitional object 214 until the transitional object 214 is completely filled. While filling the transitional object 214 is depicted in the example animation, in some other implementations, the transition may not include filling the transitional object 214 or otherwise providing a highlighting in the GUI after generating the transitional object 214. For example, instead of filling the transitional object 214, the smartphone may provide haptic or audio feedback indicating that the user input to the inline card 204 was received.

FIGS. 2L-2P show a portion of the animation corresponding to the transitional object 214 being adjusted to cover the snackbar 218 in the GUI 200. For example, the transitional object 214 may move from the location of the inline card 204 in the GUI 200 to the location of the snackbar 218 in the GUI 200. The animation corresponding to the movement of the transitional object 214 between locations (or of other adjustments to the transitional object 214) may be of any suitable duration, may include any suitable easing, or may include any suitable effects (such as bouncing or shaking). In some implementations, the transitional object 214 may be resized (such as from the size of the inline card 204) to the same size as the snackbar 218. In this manner, the animation may appear to the user that the GUI 200 morphs the inline card 204 into the snackbar 218.

In some implementations, the size of the inline card 204 is reduced in the GUI 200 concurrently with adjusting the transitional object 214. For example, after the inline card 204 is selected, the GUI 200 may be configured to make the inline card 204 appear to the user to disappear from the GUI 200. In this manner, inline cards 216 may appear to move up in the GUI 200 with the inline card 204 appearing to be removed from the GUI 200 (as depicted in progressing through FIGS. 2L-2P).

In some implementations of reducing the size of the inline card 204, each inline card may be defined by a width in columns and height in rows (which may be based on number of pixels or correspond to a display resolution). Reducing the size of the inline card may include reducing the height of the inline card over a duration of time. In this manner, the other inline cards 216 may appear to move up to the location of the inline card 204 in the GUI 200. In some implementations, the height of the inline card 204 may be reduced to zero to appear that the inline card 204 is removed from display. If the inline card 204 is to appear to be removed from display, in some implementations, the width of the inline card 204 may be reduced to zero when covered by the transitional object 214 to prevent any portion of the inline card 204 from appearing to be displayed from the perspective of the user when the transitional object 214 is moving. In some other implementations, the height of the inline card 204 may be reduced to a non-zero amount so that the inline card 204 appears smaller but does not appear to be completely removed from display.

Alternative to reducing the size of the inline card 204, in some implementations, the inline card 204 may continue to be displayed in the GUI 200. In this manner, the inline cards 216 may not move up in the GUI 200.

FIGS. 2Q-2U show a portion of the animation corresponding to unfilling the transitional object 214. In comparing FIGS. 2T and 2U, the transitional object 214 about to be completely unfilled in FIG. 2T appears the same (after unfilling) as the snackbar 218 in FIG. 2U. In some implementations, the system 100 (such as the GUI engine 140) is configured to generate text and other objects in the transitional object 214 to appear the same as the snackbar 218 before the transitional object 214 is unfilled. For example, if the animation includes a sequence of frames displayed in the GUI, the text and objects to be revealed in the transitional object 214 during unfilling may be placed in the transitional object in the frame preceding the frame in which unfilling begins. In this manner, unfilling the transitional object 214 may appear to the user as revealing the final form of the snackbar 218 (such as including a location of the user, a timer showing the amount of time recorded, and a button 220). In some other implementations, the portions of the transitional object 214 that are unfilled may be transparent. In this manner, what is seen during unfilling is a portion of the snackbar 218 under the transitional object 214. As depicted in the animation of the example transition, when the transitional object 214 is unfilled, the system 100 (such as the GUI engine 140) removes the transitional object from the GUI 200. For example, the transitional object 214 (which is not completely unfilled) covers the snackbar in FIG. 2T. The transitional object 214 is removed from the GUI 200 during the time between FIGS. 2T and 2U such that the snackbar 218 is visible to the user in FIG. 2U. In some other implementations, unfilling or removing the transitional object 214 may refer to the filled transitional object shrinking in size over time (such as depicted in the Figures depicting unfilling) to uncover over time the snackbar 218.

While the transitional object 214 is depicted as being unfilled, in some other implementations, the transitional object may be removed without being unfilled. In this manner, the contents of the snackbar 218 may appear to the user to be displayed suddenly within the snackbar 218 (which was covered by the removed transitional object 214). As such, the transition does not require filling, unfilling, or other aspects of the depicted animation to indicate the correlation between the snackbar 218 and the inline card 204.

In the specific example of the snackbar 218, the snackbar 218 includes a button 220 that may be pressed to perform one or more operations. In some implementations, pressing the button 220 may cause a submenu to be displayed in the GUI to provide the user a choice of one or more operations that may be performed. For example, the submenu may include a choice of taking a break or otherwise pausing the timer, switching projects for which time is to be recorded, or stopping the timer. In some other implementations, pressing the button 220 may automatically cause the timer to be paused or stopped.

FIGS. 2V and 2W show the snackbar 218 persisting in the GUI 200 across different pages. FIG. 2V shows the snackbar 218 being displayed on the time page of the GUI 200 (with the menu 202 depicting the time button selected). FIG. 2W shows the snackbar 218 being displayed on the chat/messages page (with the menu 202 depicting the chat button selected). In this manner, while the inline card 204 may not persist or otherwise always appear across pages, the snackbar 218 may persist or otherwise appear across pages. In some implementations, the snackbar 218 may persist across applications, similar to the icons at the top of the GUI 200. In this manner, a user may switch between applications (such as placing the timekeeping application in the background to open a web browser or another application) while still being able to access the snackbar 218. In some other implementations, the snackbar 218 may be removed from display when switching applications.

In some implementations, the snackbar 218 persists until a user input to the snackbar 218 is received. For example, the snackbar 218 may appear on the GUI 200 until the user presses the button 220 to stop recording time or to close the timekeeping application associated with the snackbar 218. Additionally or alternatively, the snackbar 218 may persist for a defined amount of time. For example, if the user is scheduled to be in his or her office for four hours, the snackbar 218 may persist for four hours and then be removed from the GUI 200. To note, for the example timekeeping application, the application may be linked to a user calendar, project management software, or other sources to manage projects, days, events, etc. for which time is to be recorded.

As noted above, an overlay may be used to show, to a user, a transition from displaying an inline card to displaying a corresponding snackbar in a GUI. In FIGS. 2A-2W, the overlay of the GUI 200 is transparent such that the objects of the GUI 200 (such as the inline cards 216) are visible through the overlay. However, the overlay may be translucent (with the inline cards 216 or other objects being blurry to the user) or may be opaque (with the inline cards 216 or other objects being blocked from view of the user). In addition, the overlay may cover the entirety of the GUI or only a portion of the GUI. For example, for FIGS. 2A-2W, the overlay may cover the entirety of the GUI 200 or the portion of the GUI 200 when excluding one or both of the menu 202 at the bottom or the notification icons at the top of the GUI 200.

FIGS. 3A-3L show a conceptual depiction of a GUI 300 including a base layer 302 and an overlay 310 for transitioning from displaying an inline card 306 to displaying a corresponding snackbar 322. The GUI 300 is an example implementation of the GUI 200 in FIGS. 2A-2W. As such, inline card 306 may be an example implementation of inline card 204, inline cards 308 may be an example implementation of inline cards 216, and menu 304 may be an example implementation of menu 202. While the overlay 310 is depicted as covering all of the base layer 302 of the GUI 300, as noted above, in some implementations, the overlay 310 may cover only a portion of the base layer 302 (such as the portion of the base layer 302 excluding the menu 304). The base layer 302 refers to the portion of the GUI 300 not associated with the transition between displaying the inline card 306 to displaying the corresponding snackbar 322. In this manner, the typical portion of the GUI 300 may be programmed with little disruption except for, in some implementations, reducing the size of an inline card or timing the generation of the snackbar to correspond to a position of a transitional object in the overlay 310. As such, the animation for the transition may be separately programmed from most of the rest of the GUI (which may improve ease in implementing such transitions or in maintaining the GUI overall).

Referring to FIG. 3A, the base layer 302 includes the inline card 306 that is associated with a corresponding snackbar to be generated when an input is received (such as when the inline card 306 is selected or a specific clock time is reached). FIG. 3A corresponds to a point in the transition preceding FIG. 2D. The overlay 310 exists when a transition from displaying the inline card 306 to displaying the snackbar occurs. In some implementations, the overlay 310 is generated when the transition is to occur (such as in response to receiving an input, such as the user selecting the inline card 306). In this manner, the overlay 310 may be deleted after the transition (with the snackbar displayed in the GUI 300). In some other implementations, the overlay 310 is present during other times that the GUI is displayed. If the overlay 310 is transparent, the overlay 310 does not interfere with user interactions with the GUI 300.

Figure 3B:
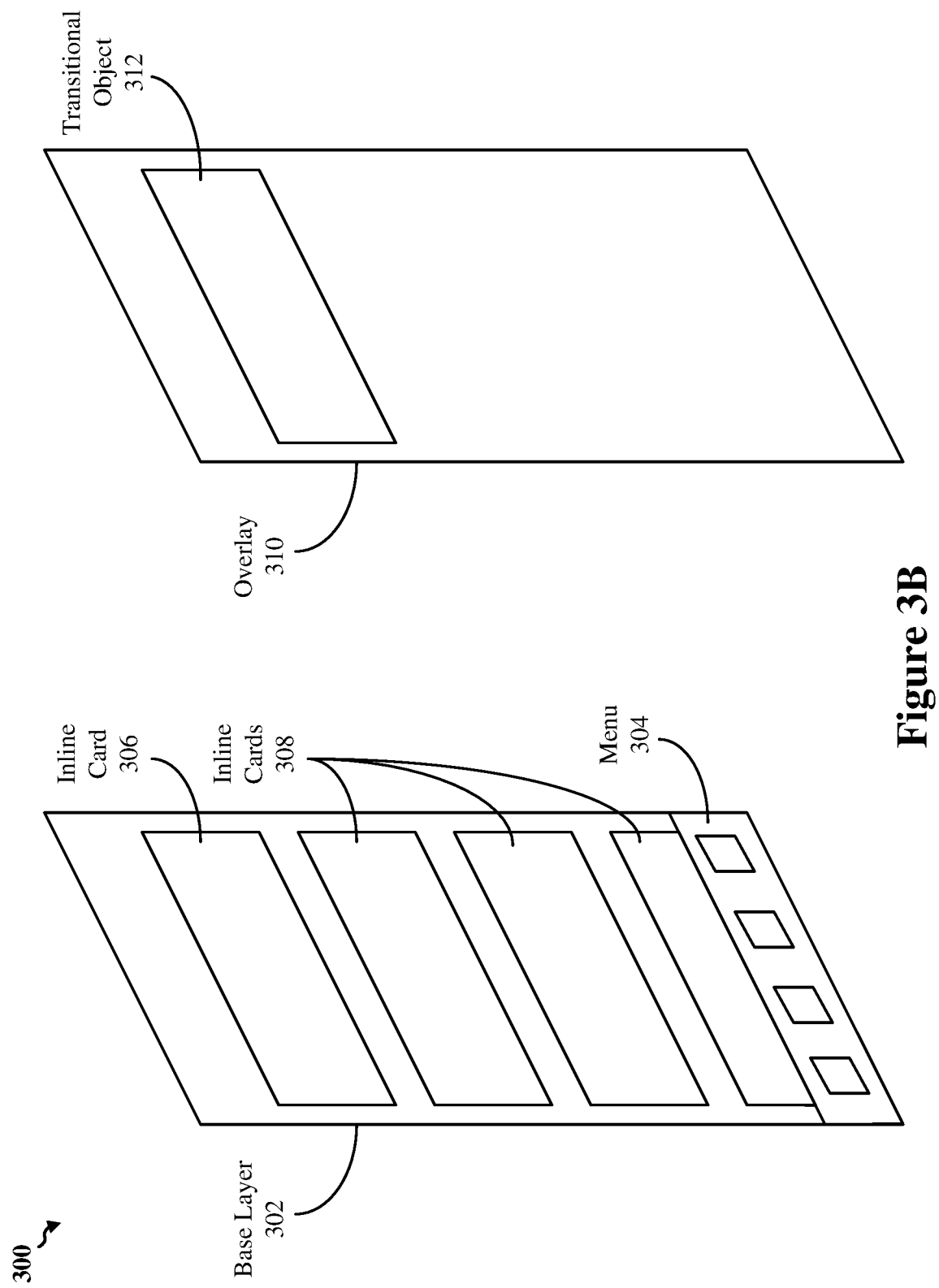

FIG. 3B shows the transitional object 312 having been generated in the overlay 310 to initially cover the inline card 306 in response to receiving an input (such as the user selecting the inline card 306). FIG. 3B corresponds to a point in the transition succeeding FIG. 2D and preceding FIG. 2E. As depicted, the transitional object 312 may be the same size and location of the inline card 306 in the GUI 300.

Figure 3C:
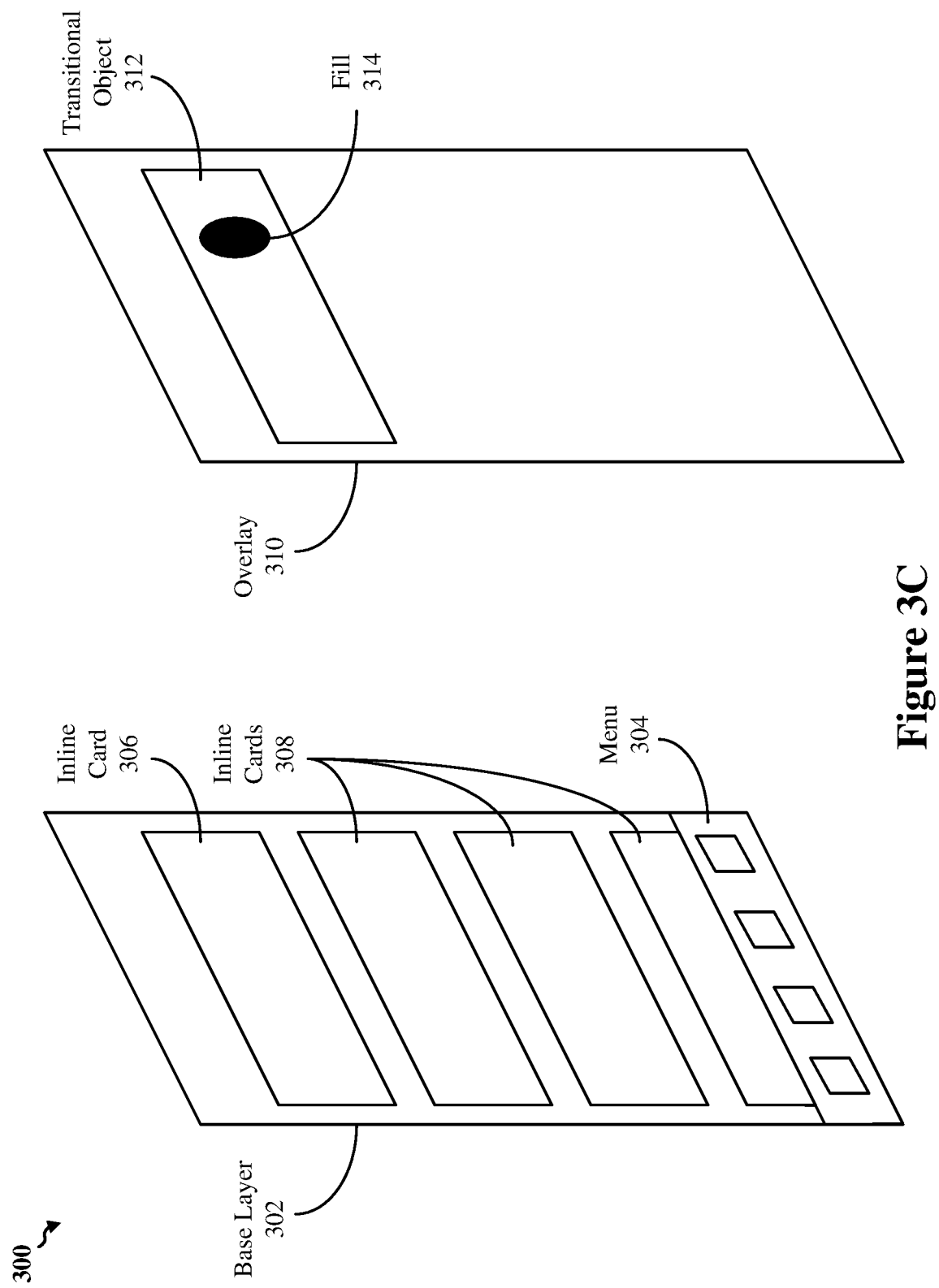
Figure 3D:
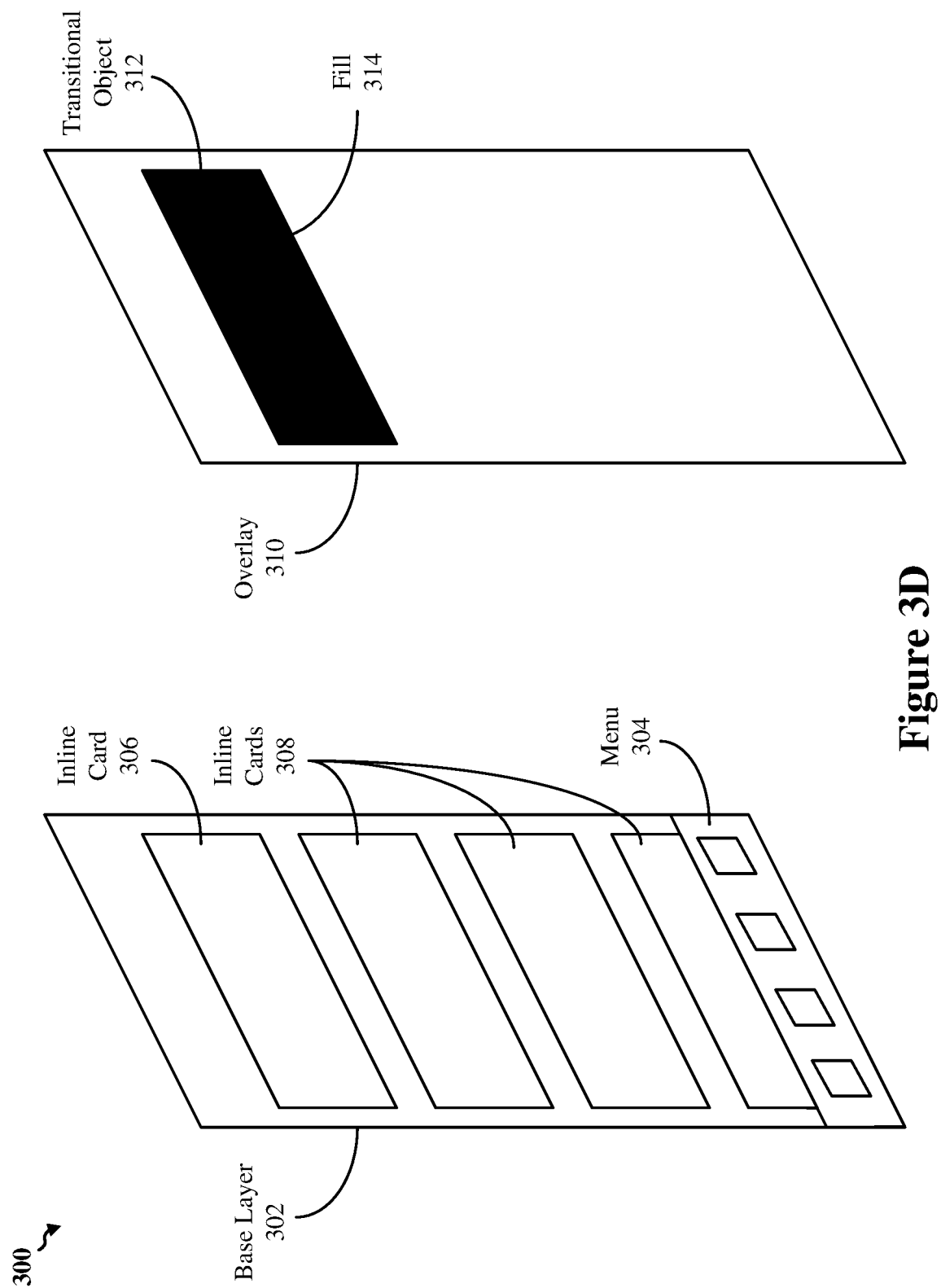

FIG. 3C shows the transitional object 312 beginning to be filled (depicted by fill 314). FIG. 3C corresponds to the same point in the transition as FIG. 2E. FIG. 3D shows the transitional object 312 completely filled (depicted by fill 314). FIG. 3D corresponds to the same point in the transition as FIG. 2K. As shown in FIGS. 3A-3D, the base layer portion of the GUI 300 during the animation may not change, with a majority of the animation being handled at the overlay 310 of the GUI 300.

Figure 3E:
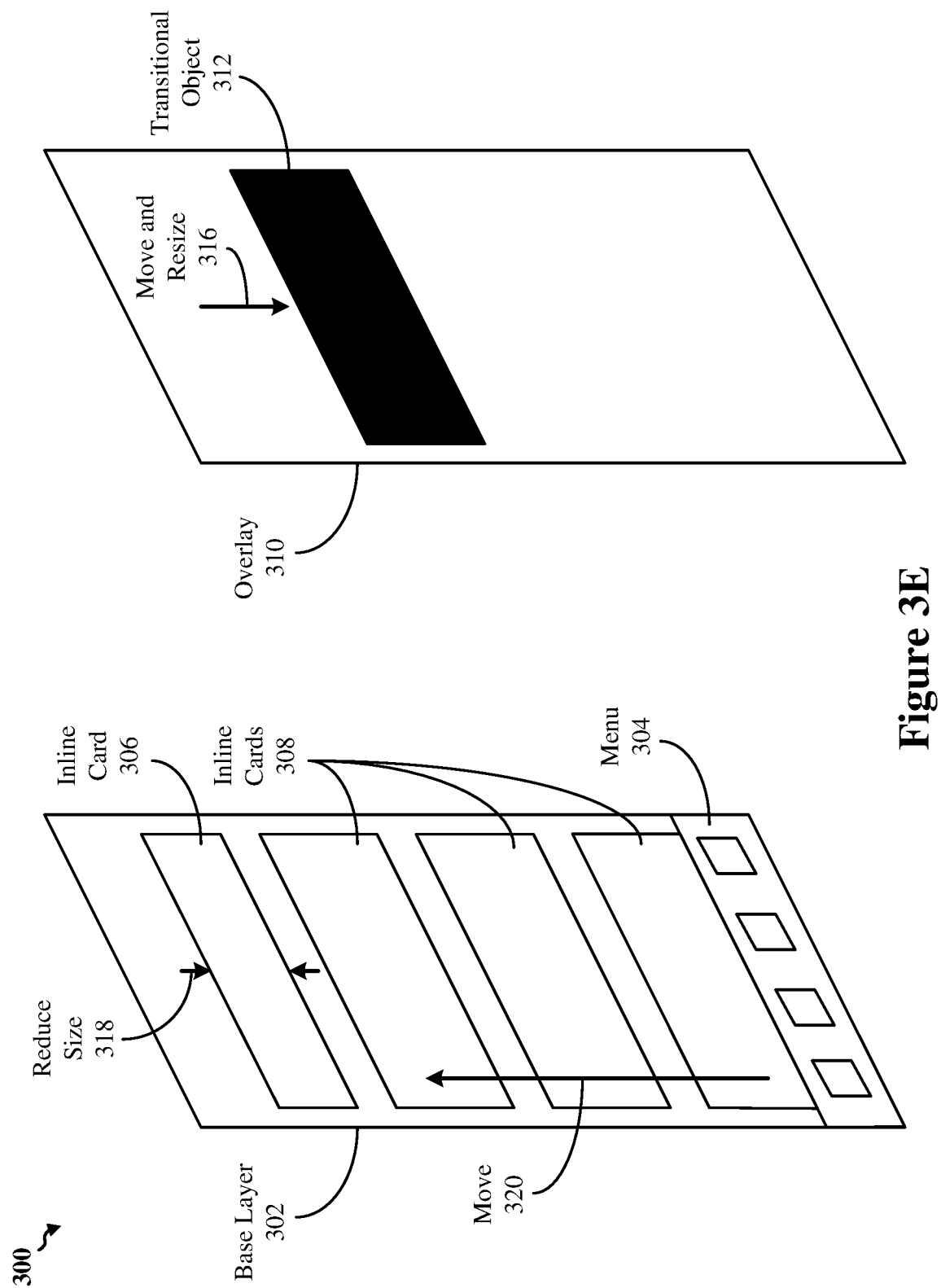
Figure 3F:
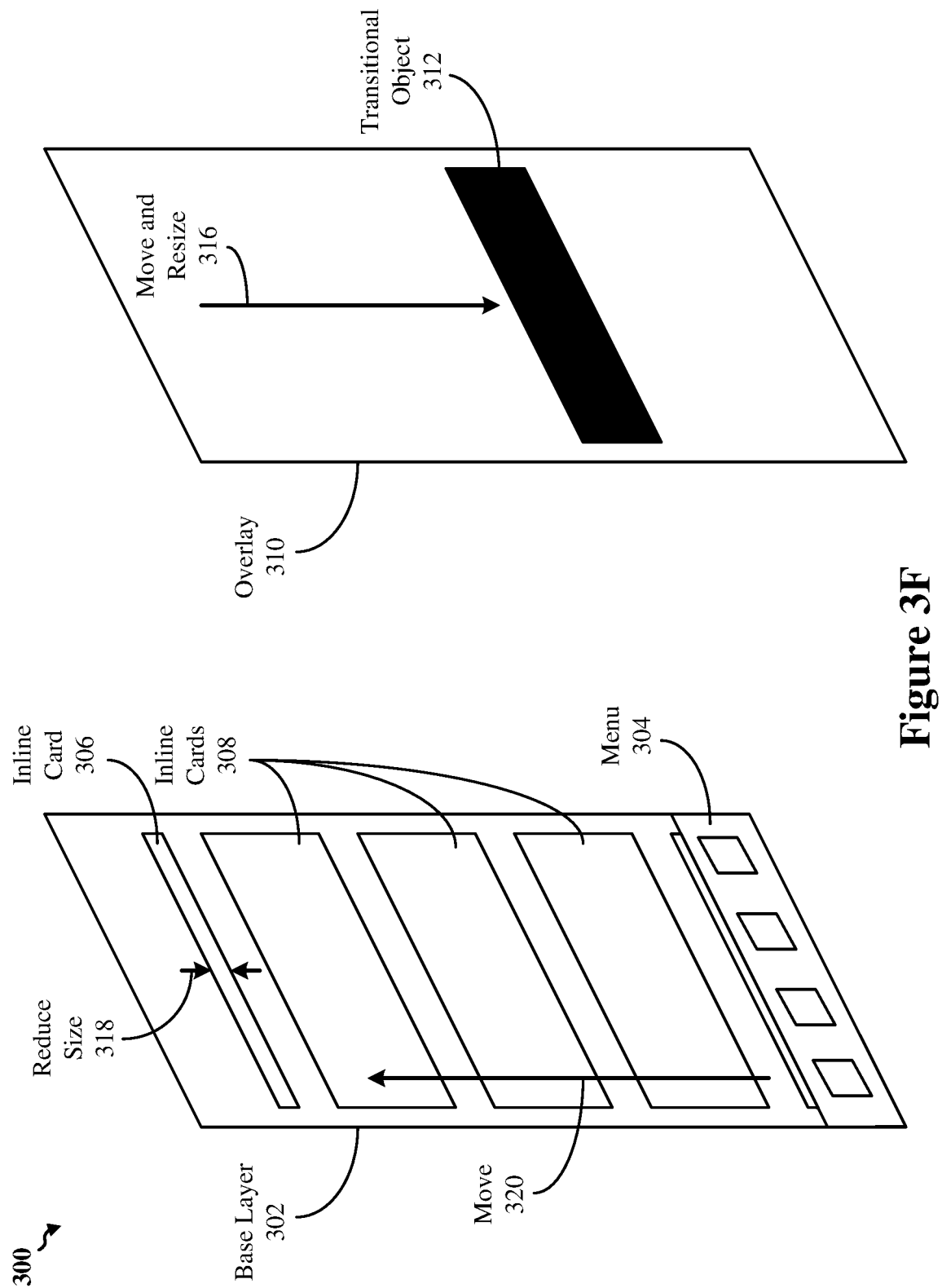
Figure 3G:
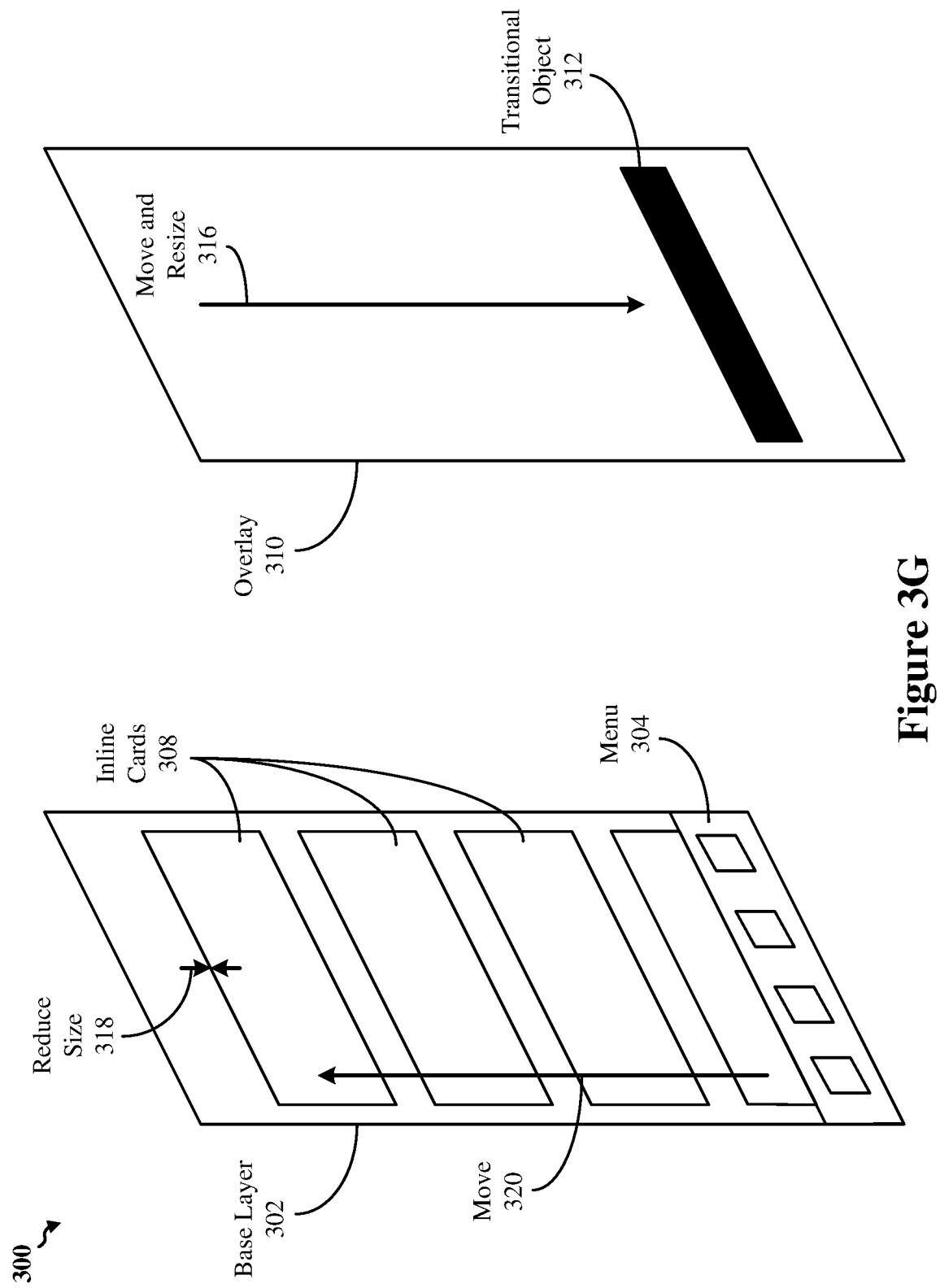

FIGS. 3E-3H show the transitional object being moved and resized to cover the snackbar 322 that is generated in the base layer 302 of the GUI 300. FIGS. 3E-3H correspond to the same portion of the transition as FIGS. 2L-2P. As depicted in FIG. 3E, the move and resize operations 316 are performed to begin adjusting the transitional object 312. As depicted, adjusting the transitional object 312 includes resizing the transitional object 312 over time from the size of the inline card 306 in the GUI 300 to the size of the snackbar 322 in the GUI 300. Adjusting the transitional object 312 also includes moving the transitional object 312 from the location of the inline card 306 in the GUI 300 to the location of the snackbar 322 in the GUI 300. Concurrently with adjusting the transitional object 312 (such as depicted in FIG. 3E and as described above with reference to FIGS. 2L-2P), the size of the inline card 306 may be reduced (depicted by reduce size operation 318) and the inline cards 308 may be moved (depicted by move operation 320). To note, the move operation 320 may be a natural effect of reducing the size of the inline card 306, with the card 308 succeeding the inline card 306 to take the space of the GUI 300 vacated by the inline card 306. For example, as depicted, reducing the size of the inline card 306 may correspond to reducing the height of the inline card 306, and the amount that the inline cards 308 are moved may be based on the amount that the height of the inline card 306 is reduced. As such, the move operation 320 and the reduce size operation 318 may be a consequence of the operation executed by the system to reduce the size of the inline card 306. While not depicted in FIGS. 3E-3H, in some implementations, the width of the inline card 306 may also be reduced (such as to zero or a value close to zero) so that the inline card seems, from the user's perspective, to disappear from the GUI 300.

Figure 3J:
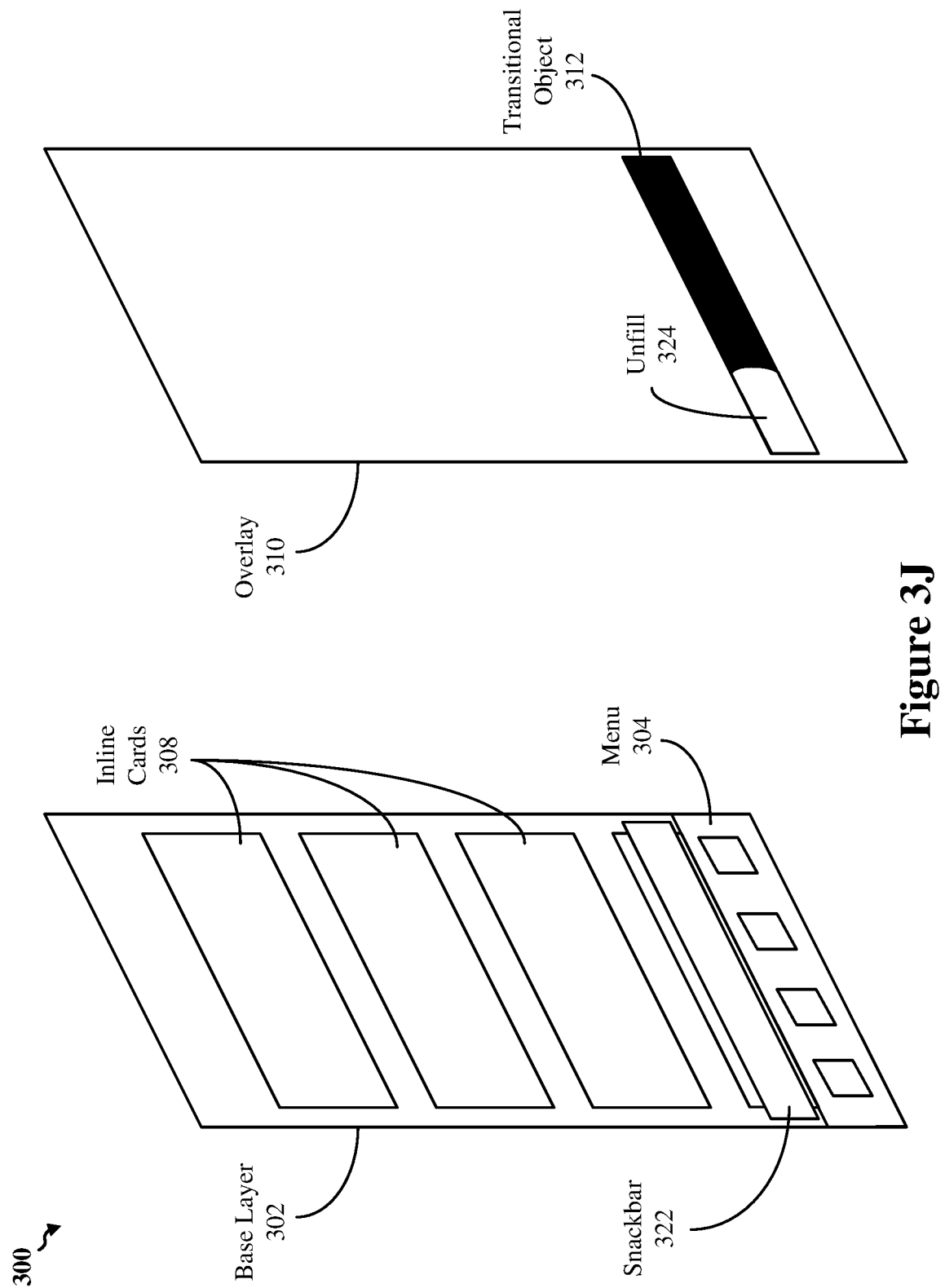
Figure 3K:
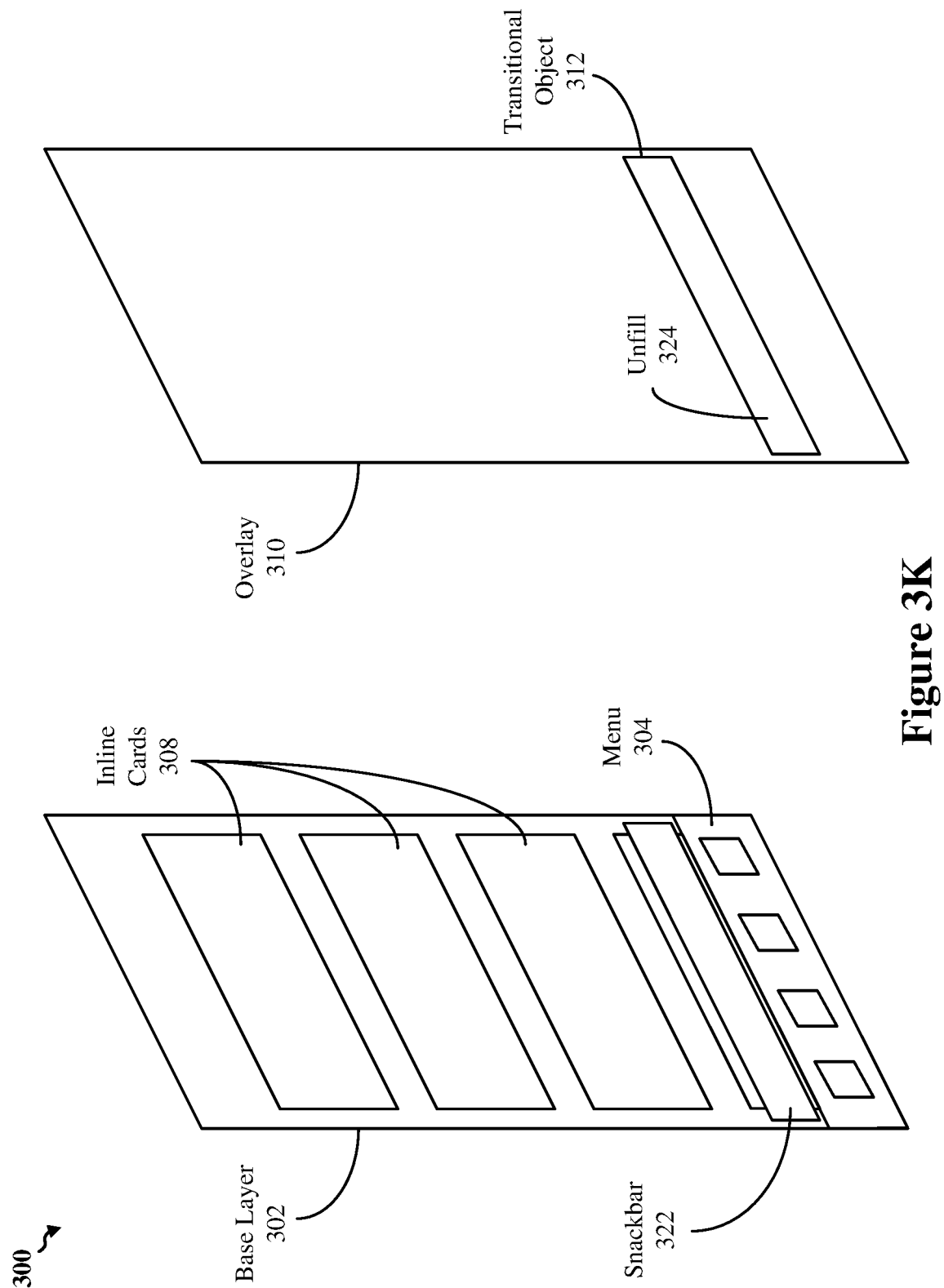

FIGS. 3J-3K show the unfilling of the transitional object 312 (depicted by unfill operation 324) after the move and resize operations 316. FIGS. 3J-3K correspond to the same portion of the transition as FIGS. 2Q-2T. As noted above, unfilling may include showing portions of the transitional object 312 that appear the same to the user as the snackbar 322, may include unfilling a transparent transitional object 312 so that portions of the snackbar 322 come into view of the user, or may include shrinking the transitional object 312 so that portions of the snackbar 322 come into view of the user.

Figure 3L:
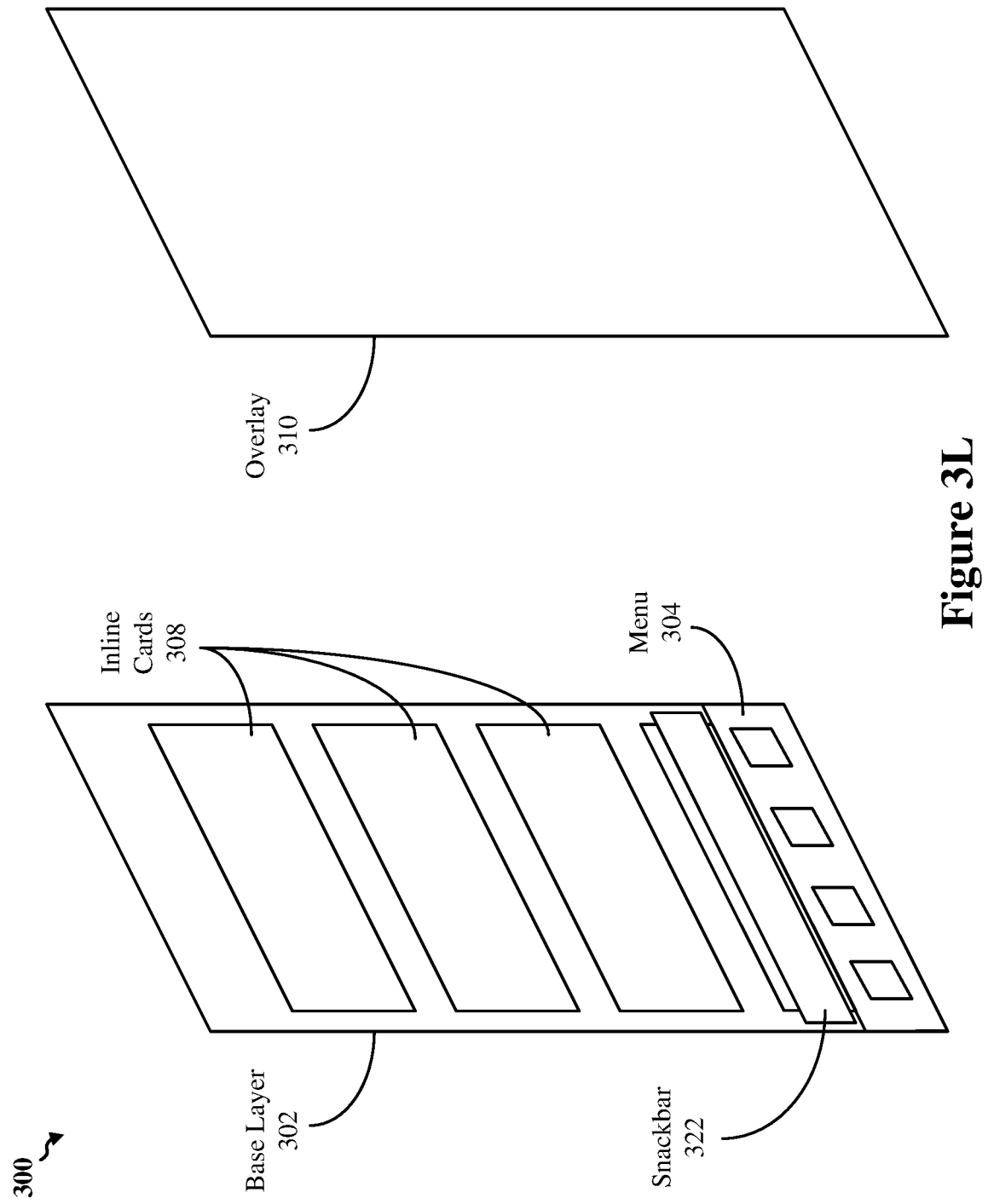

FIG. 3L shows the overlay 310 with the transitional object 312 having been removed. FIG. 3L may correspond to the same point in the transition as FIG. 2U. With the transition from displaying the inline card 306 to displaying the snackbar 322 having been completed, the transitional object 312 no longer exists in the GUI 300. In some implementations, the overlay 310 may be deleted (and thus may be generated again for a new transition). In some other implementations, the overlay 310 may persist for later use (such as for the next transition).

Figure 4:
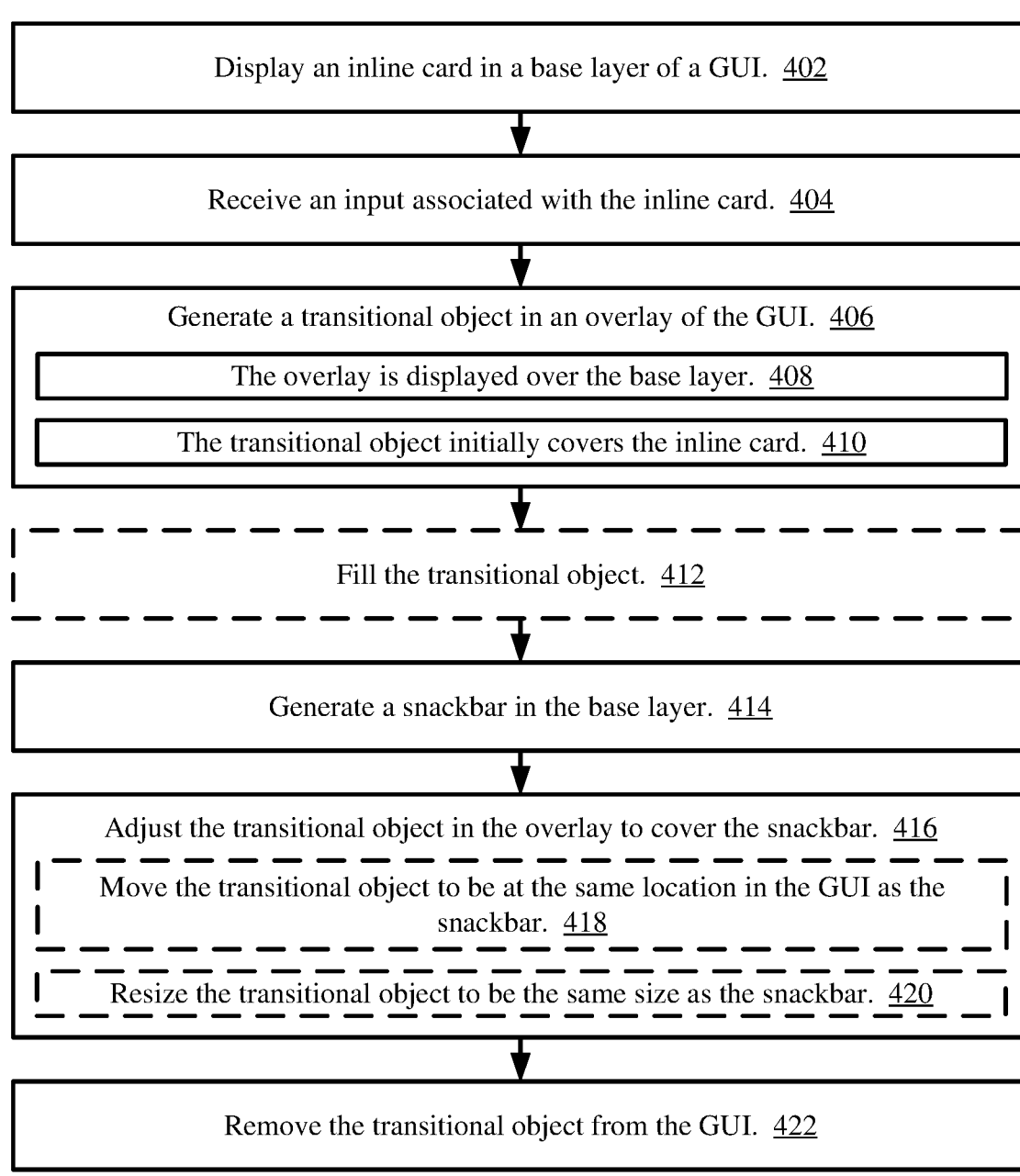
FIG. 4 shows an illustrative flow chart depicting an example operation for manipulating a GUI to transition from displaying an inline card to displaying a corresponding snackbar.

FIG. 4 shows an illustrative flow chart depicting an example operation 400 for manipulating a GUI to transition from displaying an inline card to displaying a corresponding snackbar. The example operation 400 may be performed to cause the transition depicted in FIGS. 2C-2U, which is also depicted in FIGS. 3A-3L. The operation 400 is described as being performed by the system 100 (such as by the GUI engine 140) for clarity in explaining aspects of the present disclosure. For example, if the GUI engine 140 is embodied in software, the processor 130 may execute the software in order to perform the operations described with reference to FIG. 4.

At 402, the system 100 (such as the GUI engine 140) displays an inline card in a base layer of a GUI. For example, the system 100 may output the GUI to include an inline card for display in a base layer of the GUI (as described above). In some implementations, the system 100 may also output the GUI to include an overlay that is to be displayed on top of the base layer. In some other implementations, the overlay is generated later.

At 404, the system 100 receives an input associated with the inline card. In some implementations, the input is a user input of a user interacting with the GUI. For example, the user may tap his or her finger or a stylus on the inline card (or a portion of the inline card, such as a button). In another example, the user may use a mouse, keyboard, eye tracker, or other user input device to provide a user input to the inline card. In some other implementations, the input is from another device component or another electronic device. For example, a device clock may indicate a defined time (such as the time an appointment or event is to begin) that is used as an input associated with the inline card. In another example, an indication of an application associated with the inline card as being executed is received.

In response to the input being received, the GUI is to show to the user a transition from displaying the inline card to display a snackbar corresponding to the inline card. At 406, in showing the transition, the system 100 generates a transitional object in an overlay of the GUI. The overlay is displayed over the base layer (408), and the transitional object initially covers the inline card (410). In some implementations, the system 100 generates the transitional object to initially appear the same as the inline card. For example, the transitional object may be the same size and dimensions in the GUI, may be located at the same location in the GUI, and may include the same contents and appearance as the inline card. In this manner, with the transitional object covering the inline card, the inline card still appears to be displayed in the GUI from the user's perspective. In some other implementations, the transitional object may have a different size, location, or contents than the inline card while covering the inline card.

In some implementations, the system 100 may fill the transitional object after generating the transitional object (412). In some other implementations, the transitional object may not be filled. For example, the transitional object may be generated as already a solid color. In another example, alternative to filling and unfilling the transitional object, the initial contents of the transitional object (which may appear the same as the contents of the inline card) may morph into the final contents of the transitional object (which may appear the same as the contents of the snackbar).

At 414, the system 100 generates a snackbar in the base layer. At 416, the system 100 adjusts the transitional object in the overlay to cover the snackbar. In some implementations, adjusting the transitional object includes moving the transitional object to be at the same location in the GUI as the snackbar (418). Additionally or alternatively, adjusting the transitional object may include resizing the transitional object the be the same size as the snackbar (420). For example, the transitional object may initially appear the same as the inline card (with the transitional object in the overlay and the inline card in the base layer under the overlay). The transitional object may be filled and may be moved over time from the location of the inline card in the GUI to the location of where the snackbar is to appear in the GUI. In addition, the transitional object may be resized over time to be the same size and dimensions as the snackbar. With the filled transitional object located at the same location in the GUI and having the same size and dimensions as the snackbar to be displayed, the system 100 may generate the snackbar in the base layer (with the snackbar being hidden from the user by the transitional object in the overlay).

In some implementations, concurrently with moving or otherwise adjusting the transitional object, the system 100 may reduce the size of the inline card. For example, the system 100 may reduce the size of the inline card to zero. If the inline card is organized vertically with other cards, the height of the inline card may be reduced to zero over time. If the inline card is organized horizontally with other cards, the width of the inline card may be reduced to zero over time. In some other implementations, the inline card may remain unchanged in the GUI. In this manner, the transition of displaying the inline card to displaying the snackbar may include displaying both the inline card and the corresponding snackbar after the transition.

Referring back to FIG. 4, at 422, the system 100 removes the transitional object from the GUI. For example, if the system 100 fills the transitional object at block 412, the system 100 may unfill the transitional object to show a transitional object that appears the same as the snackbar and then delete the unfilled transitional object. In another example, the filled transitional object may be unfilled, with the unfilled portion of the transitional object being transparent so that portions of the snackbar is displayed to the user. The unfilled transitional object may then be deleted. In a further example, the filled transitional object may be reduced in size so that portions of the snackbar are displayed to the user until the filled transitional object is reduced to zero and deleted. In some implementations, removing the transitional object may include deleting the overlay in the GUI. As such, the system 100 may be configured to generate the overlay in response to receiving the input.

In some implementations, with the snackbar displayed in the GUI after the transition, the system 100 may persist the snackbar until a user input to the snackbar is received. For example, as depicted in FIGS. 2U-2W, the snackbar 218 persists across various pages of the application. Additionally or alternatively, the snackbar 218 may persist across different applications or other actions of an electronic device. The user input to the snackbar may include the user tapping the snackbar or using a user input device to select a portion of the snackbar such that an operation is to be performed to cause the snackbar is to be removed from display. For example, if a snackbar includes a stop button or a close button, the user tapping the stop button or the close button may cause the snackbar to be removed from display. In another example, the user may swipe the snackbar off the display to cause the system 100 to remove the snackbar. In addition or alternative to persisting the snackbar until a user input is received, the snackbar may be persisted until another suitable event occurs. For example, the snackbar may be defined to be displayed for a defined amount of time, the snackbar may be defined to be displayed only while the corresponding application is in the foreground, or the snackbar may persist until another input is received (such as a specific clock time being reached).

As described above, the system 100 (or another suitable system) may manipulate a GUI to show, to a user, a transition from displaying an inline card to displaying a corresponding snackbar. As noted above, for the system to show the transition in the GUI, the system may use an overlay in the GUI to hide portions of a base layer of the GUI (such as an inline card or a snackbar) as well as show an animation that appears to transition an inline card to a snackbar. Through the use of an overlay, significant changes or various versions of a base layer to depict changes in the GUI are not required to be generated. In addition, the use of the overlay allows an animation of the transition to be adjusted without adjusting the underlying base layer portion of the GUI.

While the examples herein are described with reference to system 100, any suitable system may be used to perform the operations described herein. In addition, as used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while a timekeeping application is depicted in the Figures for illustrative purposes in describing aspects of the present disclosure, aspects of the present disclosure may be performed for any suitable application or for any suitable GUI. As such, the present disclosure is not limited to a specific type of application or GUI for performing aspects of the present disclosure. In another example, while a transition from displaying an inline card to displaying a snackbar in a GUI is described, aspects of the present disclosure may be performed to transition from displaying any suitable icon to displaying any other corresponding icon in the GUI. As such, the present disclosure is not limited to specific types of icons for performing aspects of the present disclosure. In a further example, while the figures and description depict an order of operations to be performed in performing aspects of the present disclosure, one or more operations may be performed in any order or concurrently to perform the described aspects of the disclosure. In addition, or to the alternative, of the order of operations being in any suitable order or operations being performed concurrently, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for manipulating a graphical user interface (GUI), the computer-implemented method comprising:
displaying an inline card in a base layer of a GUI;
receiving an input associated with the inline card; and
in response to receiving the input:
generating a transitional object in an overlay of the GUI, wherein the overlay is displayed over the base layer and the transitional object initially covers the inline card;
generating a snackbar in the base layer;
adjusting the transitional object in the overlay to cover the snackbar,
wherein adjusting the transitional object includes one or more of:
moving the transitional object to be at the same location in the GUI as the snackbar; or
resizing the transitional object to be the same size as the snackbar; and
removing the transitional object from the GUI.

2. The computer-implemented method of claim 1, further comprising reducing a size of the inline card concurrently with adjusting the transitional object.

3. The computer-implemented method of claim 2, wherein the size of the inline card is reduced to zero.

4. The computer-implemented method of claim 1, further comprising generating the transitional object to initially appear the same as the inline card.

5. The computer-implemented method of claim 4, further comprising filling the transitional object after generating the transitional object.

6. The computer-implemented method of claim 1, further comprising persisting the snackbar until a user input to the snackbar is received.

7. The computer-implemented method of claim 1, further comprising generating the overlay in response to receiving the input, wherein removing the transitional object from the GUI includes deleting the overlay.

8. A system for manipulating a graphical user interface (GUI), the system comprising:
one or more processors;
a display; and
a memory storing instructions that, when executed by the one or more processors, causes the system to perform operations comprising:
displaying, on a display, an inline card in a base layer of a GUI;
receiving an input associated with the inline card; and
in response to receiving the input:
generating a transitional object in an overlay of the GUI, wherein the overlay is displayed over the base layer and the transitional object initially covers the inline card;
generating a snackbar in the base layer;
adjusting the transitional object in the overlay to cover the snackbar,
wherein adjusting the transitional object includes one or more of:
moving the transitional object to be at the same location in the GUI as the snackbar; or
resizing the transitional object to be the same size as the snackbar; and
removing the transitional object from the GUI.

9. The system of claim 8, wherein the operations further comprise reducing a size of the inline card concurrently with adjusting the transitional object.

10. The system of claim 9, wherein the size of the inline card is reduced to zero.

11. The system of claim 8, wherein the operations further comprise generating the transitional object to initially appear the same as the inline card.

12. The system of claim 11, wherein the operations further comprise filling the transitional object after generating the transitional object.

13. The system of claim 8, wherein the operations further comprise persisting the snackbar until a user input to the snackbar is received.

14. The system of claim 8, wherein the operations further comprise generating the overlay in response to receiving the input, wherein removing the transitional object from the GUI includes deleting the overlay.

* * * * *